US012518725B2

(12) United States Patent
Li et al.

(10) Patent No.: US 12,518,725 B2
(45) Date of Patent: Jan. 6, 2026

(54) DISPLAY DEVICE AND DISPLAY METHOD

(71) Applicants: BEIJING BOE DISPLAY TECHNOLOGY CO., LTD., Beijing (CN); BOE Technology Group Co., Ltd., Beijing (CN)

(72) Inventors: Wenyu Li, Beijing (CN); Jian Zhang, Beijing (CN); Shou Li, Beijing (CN); Shuyan Ma, Beijing (CN); Xiaoning Jiang, Beijing (CN); Jing Zhang, Beijing (CN); Yingbo Gao, Beijing (CN); Zhanchang Bu, Beijing (CN); Site Cai, Beijing (CN); Tianyang Han, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 186 days.

(21) Appl. No.: 18/263,368

(22) PCT Filed: Sep. 30, 2022

(86) PCT No.: PCT/CN2022/123484

§ 371 (c)(1),
(2) Date: Jul. 28, 2023

(87) PCT Pub. No.: WO2024/065761

PCT Pub. Date: Apr. 4, 2024

(65) Prior Publication Data

US 2024/0153472 A1 May 9, 2024

(51) Int. Cl.
*G09G 5/395* (2006.01)

(52) U.S. Cl.
CPC ..... *G09G 5/395* (2013.01); *G09G 2320/0247* (2013.01); *G09G 2320/0613* (2013.01);
(Continued)

(58) Field of Classification Search
CPC .................. G09G 5/395; G09G 5/397; G09G 2340/0471; G09G 2340/478; G09G 2340/10; G09G 2340/12
See application file for complete search history.

(56) References Cited

U.S. PATENT DOCUMENTS

| | | | |
|---|---|---|---|
| 6,008,860 | A | 12/1999 | Patton et al. |
| 7,120,194 | B2 | 10/2006 | Lee |

(Continued)

FOREIGN PATENT DOCUMENTS

| | | | |
|---|---|---|---|
| CN | 1536874 | A | 10/2004 |
| CN | 1187985 | C | 2/2005 |

(Continued)

*Primary Examiner* — Antonio A Caschera

(74) *Attorney, Agent, or Firm* — Westman, Champlin & Koehler, P.A.

(57) ABSTRACT

A display device and a display method the display device includes: a memory for storing at least one pre-stored image; and a controller for: obtaining first and second target images according to at least one pre-stored image; and controlling a display module, according to a first control instruction, to display the second target image and hide a display of at least one first sub-region in a first region in a frame displayed after switching from the first target image to the second target image. A size of the first target image is different from that of the second target image, and/or a position of the first target image in a display picture is different from that of the second target image. The first region represents a region within an outer contour of the first target image and not overlapping with the second target image.

20 Claims, 8 Drawing Sheets

(52) U.S. Cl.
CPC ............... *G09G 2340/0471* (2013.01); *G09G 2340/0478* (2013.01); *G09G 2340/10* (2013.01)

(56) References Cited

U.S. PATENT DOCUMENTS

| | | | | |
|---|---|---|---|---|
| 7,324,122 | B2 | 1/2008 | Tsai | |
| 7,526,144 | B2 | 4/2009 | Maki et al. | |
| 2003/0093817 | A1 | 5/2003 | Lee | |
| 2004/0165780 | A1 | 8/2004 | Maki et al. | |
| 2005/0055356 | A1 | 3/2005 | Tsai | |
| 2006/0176376 | A1 | 8/2006 | Dyke et al. | |
| 2010/0045691 | A1 * | 2/2010 | Naito | H04N 21/8146 345/581 |
| 2010/0134685 | A1 * | 6/2010 | Nakamura | H04N 5/44504 348/569 |
| 2012/0134595 | A1 | 5/2012 | Fonseca et al. | |
| 2012/0307156 | A1 | 12/2012 | Matsuno et al. | |
| 2017/0345197 | A1 * | 11/2017 | Sakai | G06T 11/60 |
| 2021/0233248 | A1 | 7/2021 | Li et al. | |
| 2022/0254321 | A1 * | 8/2022 | Ogiso | G09G 5/377 |
| 2023/0316625 | A1 | 10/2023 | Yang | |

FOREIGN PATENT DOCUMENTS

| | | | |
|---|---|---|---|
| CN | 101383927 | A | 3/2009 |
| CN | 101789129 | A | 7/2010 |
| CN | 102498499 | A | 6/2012 |
| CN | 304834654 | S | 9/2018 |
| CN | 108810648 | A | 11/2018 |
| CN | 109961453 | A | 7/2019 |
| CN | 112365980 | A | 2/2021 |
| CN | 112764845 | A | 5/2021 |
| CN | 112951168 | A | 6/2021 |
| CN | 113031898 | A | 6/2021 |
| CN | 114140408 | A | 3/2022 |
| CN | 114489553 | A | 5/2022 |
| CN | 114639355 | A | 6/2022 |
| JP | H0729028 | A | 1/1995 |
| JP | H09128197 | A | 5/1997 |
| JP | 2005286920 | A | 10/2005 |
| JP | 2006276269 | A | 10/2006 |
| JP | 2007280069 | A | 10/2007 |
| JP | 2009232178 | A | 10/2009 |
| TW | I222595 | B | 10/2004 |

* cited by examiner

DISPLAY DEVICE AND DISPLAY METHOD

CROSS REFERENCE TO RELATED APPLICATION(S)

This application is a Section 371 National Stage Application of International Application No. PCT/CN2022/123484, filed on Sep. 30, 2022, entitled "DISPLAY DEVICE AND DISPLAY METHOD", the entire content of which is incorporated herein in its entirety by reference.

TECHNICAL FIELD

The present disclosure relates to a field of a display technology, in particular to a display device and a display method.

BACKGROUND

The display technology is developing with a development of information science and technology. A display device based on the display technology may provide users with various functions. For example, the display device may provide the users with an image switching function.

SUMMARY

In view of this, the present disclosure provides a display device and a display method.

According to an aspect of the present disclosure, a display device is provided, including: a memory configured to store at least one pre-stored image; and a controller configured to: obtain a first target image and a second target image according to the at least one pre-stored image; and control a display module, according to a first control instruction, to display the second target image and hide a display of at least one first sub-region in a first region in a frame displayed after switching from the first target image to the second target image; a size of the first target image is different from a size of the second target image, and/or a position of the first target image in a display picture is different from a position of the second target image in the display picture; and the first region represents a region located within an outer contour of the first target image and not overlapping with the second target image.

According to the embodiments of the present disclosure, the controller is further configured to control the display module, according to the first control instruction, to display the second target image and continue to display at least one first sub-region in the first region in the frame displayed after switching from the first target image to the second target image.

According to the embodiments of the present disclosure, the first target image is obtained according to a target pre-stored image, the second target image is obtained according to a pre-stored image different from the target pre-stored image, and the target pre-stored image is one of the at least one pre-stored image; or the first target image and the second target image are obtained according to a same pre-stored image.

According to the embodiments of the present disclosure, the controller is configured to: determine the first region according to a first parameter information of the first target image and a second parameter information of the second target image; and generate the first control instruction according to the first parameter information of the first region, the second target image, and the second parameter information; the first parameter information includes a first position information, or the first parameter information includes a second position information and a first size information; and the second parameter information includes a third position information, or the second parameter information includes a fourth position information and a second size information.

According to the embodiments of the present disclosure, the controller is further configured to: determine a positional relationship between the first region and the second target image according to the second parameter information and the first parameter information of the first region; control the display module, according to the first control instruction, to display the second target image and hide a display of a first target sub-region, in response to determining that the first region includes the first target sub-region according to the positional relationship; or control the display module, according to the first control instruction, to display the second target image and hide a display of the first target sub-region and a second target sub-region, in response to determining that the first region includes the first target sub-region and the second target sub-region according to the positional relationship; or the display module, according to the first control instruction, to display the second target image and hide a display of the first target sub-region, the second target sub-region and a third target sub-region, in response to determining that the first region includes the first target sub-region, the second target sub-region and the third target sub-region according to the positional relationship; or control the display module, according to the first control instruction, to display the second target image and hide a display of the first target sub-region, the second target sub-region, the third target sub-region and a fourth target sub-region, in response to determining that the first region includes the first target sub-region, the second target sub-region, the third target sub-region and the fourth target sub-region according to the positional relationship; and the first target sub-region is a first sub-region located on a side of the second target image in a first direction, the second target sub-region is a first sub-region located on a side of the second target image in a second direction, the third target sub-region is a first sub-region located on a side of the second target image in a third direction, and the fourth target sub-region is a first sub-region located on a side of the second target image in a fourth direction.

According to the embodiments of the present disclosure, two of the first direction, the second direction, the third direction and the fourth direction are parallel to a row extension direction of a pixel arrangement of the second target image, and the other two are parallel to a column extension direction of the pixel arrangement of the second target image.

According to the embodiments of the present disclosure, the controller is further configured to: control the display module, according to the first control instruction, to display the second target image and hide a display of at least partial region located on a side of the second target image in a first direction; or control the display module, according to the first control instruction, to display the second target image and hide a display of at least partial region located on the side of the second target image in the first direction and a side of the second target image in a second direction; or control the display module, according to the first control instruction, to display the second target image and hide a display of at least partial region located on the side of the second target image in the first direction, the side of the second target image in the second direction and a side of the second target image in a third direction; or control the display module, according to the first control instruction, to display the second target image and hide a display of at least partial region located on the side of the second target image in the first direction, the side of the second target image in the second direction, the side of the second target image in the third direction and a side of the second target image in a fourth direction; or control the display module, according to the first control instruction, to display the second target image and hide a display of the first region; and two of the first direction, the second direction, the third direction and the fourth direction are parallel to a row extension direction of a pixel arrangement of the second target image, and the other two are parallel to a column extension direction of the pixel arrangement of the second target image.

According to the embodiments of the present disclosure, the controller includes: a display buffer configured to store a plurality of target images, and the plurality of target images are stored according to respective third parameter information of the plurality of target images, and the third parameter information includes a fifth position information, or the third parameter information includes a sixth position information and a third size information; and a processor configured to: generate a second control instruction for the plurality of target images in response to a detection of a synchronous display instruction; and control the display module, according to the second control instruction, to synchronously display the plurality of target images in a same frame of display picture.

According to the embodiments of the present disclosure, the plurality of target images include the second target image and a third target image; and a size of the third target image is different from the size of the first target image, and/or a position of the third target image in a display picture is different from the position of the first target image in the display picture.

According to the embodiments of the present disclosure, the controller is further configured to: determine, based on an initiation identification, a second region according to a fourth parameter information of a fourth target image and a fifth parameter information of a fifth target image; and generate a third control instruction according to the fourth parameter information of the second region, the fourth target image, and the fifth parameter information; control the display module, according to the third control instruction, to display the fourth target image and hide a display of at least one second sub-region in the second region in a frame displayed after switching from the fourth target image to the fifth target image; the initiation identification represents an initiation of an operation of processing the fifth target image while the fourth target image is being displayed; the second region represents a region located within an outer contour of the fourth target image and not overlapping with the fifth target image; the fourth parameter information includes a seventh position information, or the fourth parameter information includes an eighth position information and a fourth size information; and the fifth parameter information includes a ninth position information, or the fifth parameter information includes a tenth position information and a fifth size information.

According to the embodiments of the present disclosure, a driving signal and a pre-stored image signal exist simultaneously in a process of the controller controlling the display module to display the first target image; and the driving signal represents a signal allowing the controller to drive the display module to display, and the pre-stored image signal represents a signal allowing the memory to transmit the pre-stored image to the controller.

According to the embodiments of the present disclosure, a display duration of the first target image is one frame; and the controller is configured to control the display module, according to the first control instruction, to display the second target image and completely hide a display of the first region in the frame displayed after switching from the first target image to the second target image.

According to the embodiments of the present disclosure, the controller is configured to: determine an eighth parameter information according to a sixth parameter information of a sixth target image and a seventh parameter information of a seventh target image in response to a detection of a switching instruction; obtain an eighth target image according to the eighth parameter information, the sixth target image, and the seventh target image; generate a fourth control instruction according to the eighth target image and the eighth parameter information of the eighth target image; and control the display module, according to the fourth control instruction, to display the eighth target image; the switching instruction represents an instruction to switch from a complete display of the sixth target image to a display of the seventh target image, and the sixth target image and the seventh target image have a scaling relationship; the sixth parameter information includes an eleventh position information, or the sixth parameter information includes a twelfth position information and a sixth size information; the seventh parameter information includes a thirteenth position information, or the seventh parameter information includes a fourteenth position information and a seventh size information; and the eighth parameter information includes a fifteenth position information, or the eighth parameter information includes a sixteenth position information and an eighth size information.

According to the embodiments of the present disclosure, the controller is further configured to: determine a third region according to the sixth parameter information and the seventh parameter information; generate a fifth control instruction according to the sixth parameter information of the third region, the eighth target image, and the eighth parameter information of the eighth target image; and control the display module, according to the fifth control instruction, to display the eighth target image and hide a display of at least one third sub-region in the third region in a frame displayed after switching from the sixth target image to the eighth target image According to the embodiments of the present disclosure, the first target image is the target pre-stored image; or the first target image is obtained by processing the target pre-stored image.

According to the embodiments of the present disclosure, in a case that the first target image is obtained by processing the target pre-stored image, the controller is further configured to process the target pre-stored image according to a parameter information of the target pre-stored image and a first parameter information of the first target image, so as to obtain the first target image.

According to the embodiments of the present disclosure, the controller is further configured to: determine an angle deviation between the target pre-stored image and a first target image to be generated, according to the parameter information of the target pre-stored image and the first parameter information of the first target image; and obtain the first target image according to the target pre-stored image, the parameter information of the target pre-stored image, and the angle deviation.

According to the embodiments of the present disclosure, a size of the target pre-stored image is greater than the size of the first target image; and the controller is configured to: determine a reduction ratio according to the parameter information of the target pre-stored image and the first parameter information; determine a region to be eliminated in the image according to the reduction ratio; and process the region to be eliminated to obtain the first target image.

According to the embodiments of the present disclosure, the controller is further configured to: determine an overflow region of the target pre-stored image according to a display region information and the parameter information of the target pre-stored image; and clip the overflow region to obtain the first target image; and the overflow region is a region of the target pre-stored image outside a display region of the display module.

According to the embodiments of the present disclosure, a pre-stored image signal does not appear during a time period between a time instant when the first target image starts to be presented on the display module and a time instant when the second target image starts to be presented on the display module; and the pre-stored image signal represents a signal allowing the memory to transmit the pre-stored image to the controller.

According to the embodiments of the present disclosure, a contour shape of the pre-stored image is a rectangle; and a size of the pre-stored image is less than a size of a display picture of the display module.

According to the embodiments of the present disclosure, the controller is configured to control the display module to display a first background while displaying the first target image, and a color of the first background located at a periphery of the first target image is consistent with a bottom color of the first target image; and/or the controller is configured to control the display module to display a second background while displaying the second target image, and a color of the second background located at a periphery of the first target image is consistent with a bottom color of the second target image.

According to another aspect, a display method is provided, including: obtaining a first target image and a second target image according to at least one pre-stored image; and displaying the second target image and hiding a display of at least one first sub-region in a first region in a frame displayed after switching from the first target image to the second target image, according to a first control instruction; a size of the first target image is different from a size of the second target image, and/or a position of the first target image in a display picture is different from a position of the second target image in the display picture; and the first region represents a region located within an outer contour of the first target image and not overlapping with the second target image.

According to the embodiments of the present disclosure, the display method further includes: determining the first region according to a first parameter information of the first target image and a second parameter information of the second target image; and generating the first control instruction according to the first parameter information of the first region, the second target image, and the second parameter information, and the first parameter information includes a first position information, or the first parameter information includes a second position information and a first size information; and the second parameter information includes a third position information, or the second parameter information includes a fourth position information and a second size information.

According to the embodiments of the present disclosure, the display method further includes: determining a positional relationship between the first region and the second target image according to the second parameter information and the first parameter information of the first region; displaying the second target image and hiding a display of a first target sub-region according to the first control instruction, in response to determining that the first region includes the first target sub-region according to the positional relationship; or displaying the second target image and hiding a display of the first target sub-region and a second target sub-region according to the first control instruction, in response to determining that the first region includes the first target sub-region and the second target sub-region according to the positional relationship; or displaying the second target image and hiding a display of the first target sub-region, the second target sub-region and a third target sub-region according to the first control instruction, in response to determining that the first region includes the first target sub-region, the second target sub-region and the third target sub-region according to the positional relationship; or displaying the second target image and hiding a display of the first target sub-region, the second target sub-region, the third target sub-region and a fourth target sub-region according to the first control instruction, in response to determining that the first region includes the first target sub-region, the second target sub-region, the third target sub-region and the fourth target sub-region according to the positional relationship, the first target sub-region is a first sub-region located on a side of the second target image in a first direction, the second target sub-region is a first sub-region located on a side of the second target image in a second direction, the third target sub-region is a first sub-region located on a side of the second target image in a third direction, and the fourth target sub-region is a first sub-region located on a side of the second target image in a fourth direction.

According to the embodiments of the present disclosure, a display duration of the first target image is one frame, and/or a display duration of the second target image is one frame.

According to the embodiments of the present disclosure, the display method further includes: storing a plurality of target images, and the plurality of target images are stored according to respective third parameter information of the plurality of target images, and the third parameter information includes a fifth position information, or the third parameter information includes a sixth position information and a third size information; generating a second control instruction for the plurality of target images in response to a detection of a synchronous display instruction; and synchronously displaying the plurality of target images in a same frame of display picture according to the second control instruction.

BRIEF DESCRIPTION OF THE DRAWINGS

The above and other objectives, features and advantages of the present disclosure will be clearer through following descriptions of the present disclosure with reference to the accompanying drawings, in which.

DETAILED DESCRIPTION OF EMBODIMENTS

Figure 1:
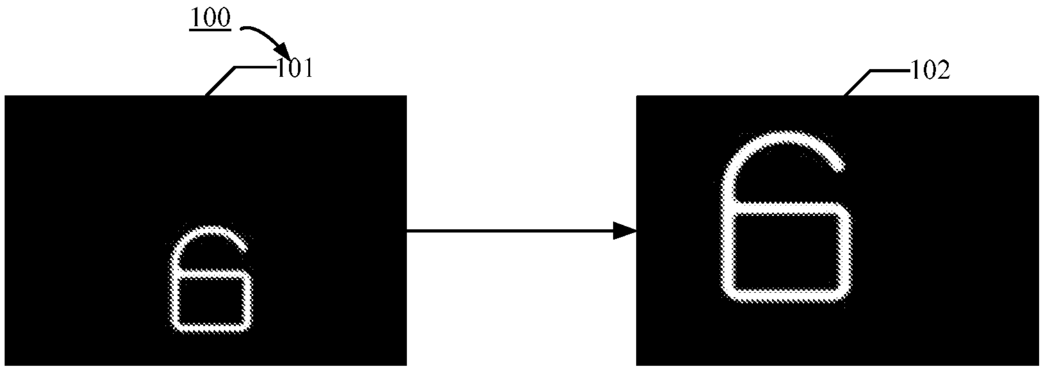
FIG. 1 schematically shows an example schematic diagram of switching between two adjacent images.

Embodiments of the present disclosure will be described below with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

Terms used herein are for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms (including technical and scientific terms) used herein have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B and C", it should be explained according to the meaning of the expression generally understood by those skilled in the art (for example, "a system including at least one of A, B and C" should include but not be limited to a system including A alone, a system including B alone, a system including C alone, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

A controller in a display device may be used to control a display module to display at least one image. In a process of switching between two adjacent images, it is needed to firstly eliminate a display of a previous image and then display a current image, and then an evolution process including image clipping, background repainting, and image clipping may occur in an overlapping region of the two adjacent images. Accordingly, a pixel value in the overlapping region may change, resulting in a flickering process from bright to dark and then to bright. The flickering process may be recognized by a user, which affects a user experience.

FIG. 1 schematically shows an example schematic diagram of switching between two adjacent images.

As shown in FIG. 1, in 100, an image 101 and an image 102 are two adjacent images. There is an overlapping region between the image 101 and the image 102. During a process of switching from displaying the image 101 to displaying the image 102, the overlapping region between the image 101 and the image 102 may exhibit a change from bright to dark and then to bright.

Therefore, the embodiments of the present disclosure propose a display device. For example, the display device may include a memory, a controller, and a display module. The memory is used to store at least one pre-stored image. The controller is used to: obtain a first target image and a second target image according to the at least one pre-stored image; control the display module, according to the first control instruction, to display the second target image and hide a display of at least one first sub-region in a first region in a frame displayed after switching from the first target image to the second target image. A size of the first target image is different from a size of the second target image, and/or a position of the first target image in a display picture is different from a position of the second target image in the display picture. The first region represents a region located within an outer contour of the first target image and not overlapping with the second target image.

According to the embodiments of the present disclosure, since the controller controls the display module, according to the first control instruction, to display the second target image in the frame displayed after switching from the first target image to the second target image, the second target image may directly cover the overlapping region between the first target image and the second target image in the frame displayed after switching from the first target image to the second target image, so that the flickering process from bright to dark and then to bright during the switching from the first target image to the second target image may be effectively avoided, thereby improving a display effect and a user viewing experience.

Figure 2A:
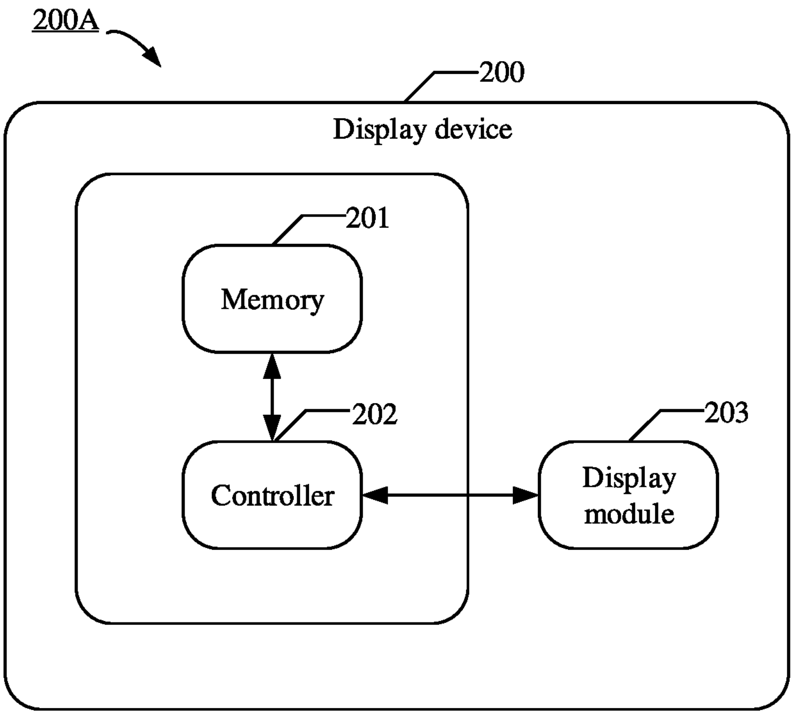
FIG. 2A schematically shows a block diagram of a display device according to the embodiments of the present disclosure.

FIG. 2A schematically shows a block diagram of a display device according to the embodiments of the present disclosure.

As shown in FIG. 2A, in 200A, a display device 200 may include a memory 201, a controller 202, and a display module 203. The controller 202 may be connected to the memory 201 and the display module 203, respectively.

The memory 201 may store at least one pre-stored image.

The controller 202 may obtain a first target image and a second target image according to the at least one pre-stored image, and control the display module 203, according to the first control instruction, to display the second target image and hide a display of at least one first sub-region in the first region in a frame displayed after switching from the first target image to the second target image.

According to the embodiments of the present disclosure, a size of the first target image may be different from a size of the second target image, and/or a position of the first target image in the display picture may be different from a position of the second target image in the display picture. The first region may represent a region located within an outer contour of the first target image and not overlapping with the second target image.

According to the embodiments of the present disclosures, the memory 201 may include one or more memories 201. The memory 201 may include a non-volatile memory, which may include at least one of EPROM (Erasable Programmable Read Only Memory) or EEPROM (Electrically Erasable Programmable Read-Only Memory). EEPROM may include a flash memory.

According to the embodiments of the present disclosure, the controller 202 may include a micro control unit (MCU), which may include at least one of CPU (Central Processing Unit), display buffer, internal memory, timer, external interrupt, communication interface, or watchdog timer. The communication interface may include at least one of SPI (Serial Peripheral Interface), UART (Universal Asynchronous Receive Transmit), or I2C interface.

According to the embodiments of the present disclosure, the display module 203 may include a display screen, which may include at least one of LCD (Liquid Crystal Display), LED (Light Emitting Diode) display screen, or OLED (Organic Electroluminescence Display) display screen.

According to the embodiments of the present disclosure, the controller 202 may be communicatively connected to the memory 201 via the communication interface. In addition, the display device 200 may further include a connector. The controller 202 may be communicatively connected to the display module 203 via the connector.

According to the embodiments of the present disclosures, the display device 200 may be applied to various fields. For example, the display device 200 may be at least one of: a home display device, a medical display device, or an industrial control display device.

According to the embodiments of the present disclosure, the pre-stored image may represent an image pre-stored in the memory 201. A storage operation may be performed before a product delivery, or may be determined by the user according to actual service needs, which is not limited here. In addition, the pre-stored image may be obtained by performing an image compression on the original image. For example, the image compression may include at least one of clipping or capturing, etc. The pre-stored image may contain a valid information of the original image. A contour shape of the pre-stored image may be determined according to actual service needs and is not limited here. For example, the contour shape of an image may include at least one of a regular shape or an irregular shape. The regular shape may include at least one of rectangle, circle, triangle, or ellipse, etc. A form of the original image may include at least one of a dynamic image and a static image. The dynamic image may include at least one of a video frame in a video or an image in GIF (Graphics Interchange Format).

According to the embodiments of the present disclosure, an image may have a parameter information corresponding to the image. The parameter information may refer to a parameter information related to a display position of the image. The display position may refer to a position displayed in the display module. For example, the parameter information may include a complete position information. Alternatively, the parameter information may include a component position information and a size information. Alternatively, the parameter information may include a component position information and an angle information. The angle information may refer to an angle between any two adjacent edges of the image. The size information may include a width information and a height information. The position information may include a coordinate information. The coordinate information may include a coordinate information of a predetermined point. The predetermined point may include at least one of a vertex, a center point, or other fixed points. The coordinate information may include a horizontal coordinate and a vertical coordinate. The complete position information may refer to an information solely according to which the display position of the image may be determined. The component position information may refer to an information that needs to be combined with other parameter information to determine the display position of the image. Other parameter information may include at least one of the size information or the angle information. The image may include at least one of the pre-stored image or the target image. The target image may include at least one of a first target image, a second target image, a third target image, a fourth target image, a fifth target image, a sixth target image, a seventh target image, or an eighth target image.

According to the embodiments of the present disclosure, the pre-stored image may have a parameter information corresponding to the pre-stored image, that is, the pre-stored image is associated with the parameter information of the pre-stored image. Alternatively, the pre-stored image has no parameter information corresponding to the pre-stored image, that is, the parameter information of the pre-stored image is not associated with the pre-stored image. For example, the pre-stored image is a single icon.

According to the embodiments of the present disclosure, the target image may have a parameter information corresponding to the target image, that is, the target image is associated with the parameter information of the target image.

For example, the contour shape of the image may be a rectangle, which has a lower left vertex, an upper left vertex, an upper right vertex, and a lower right vertex. The parameter information may include a complete position information, which may include coordinates of the lower left vertex, coordinates of the upper left vertex, coordinates of the upper right vertex, and coordinates of the lower right vertex. Alternatively, the complete coordinate information may include the coordinate information of two vertices on a diagonal. For example, the complete coordinate information may include the coordinates of the lower left vertex and the coordinates of the upper right vertex. The coordinates of the lower left vertex may include the horizontal coordinate of the lower left vertex and the vertical coordinate of the lower left vertex. The coordinates of the upper left vertex may include the horizontal coordinate of the upper left vertex and the vertical coordinate of the upper left vertex. The coordinates of the upper right vertex may include the horizontal coordinate of the upper right vertex and the vertical coordinate of the upper right vertex. The coordinates of the lower right vertex may include the horizontal coordinate of the lower right vertex and the vertical coordinate of the lower right vertex. The parameter information may include the component position information and the size information. The component position information may include the coordinates of the lower left vertex.

According to the embodiments of the present disclosure, the parameter information of the image may further include a head address. The head address may refer to an address of a first cell in the memory 201 occupied by the image. The parameter information may be stored in a two-dimensional array, which may be stored in the controller 102. For example, the parameter information of the image may include the component position information, the size information, and the head address. The component position information may include the coordinates of the lower left vertex. The coordinates of the lower left vertex may include the horizontal coordinate of the lower left vertex and the vertical coordinate of the lower left vertex. The size information may include the width information and the height information. For example, the two-dimensional array may be UINT32 gif_effect11[1][5]={82, 61, 8, 38, 0x00000000}, where "82" represents the horizontal coordinate of the lower left vertex, "61" represents the vertical coordinate of the lower left vertex, "8" represents the width information, "38" represents the height information, and "0x00000000" represents the head address.

According to the embodiments of the present disclosure, the first target image may be obtained according to the at least one pre-stored image, which may include that the first target image is obtained according to a target pre-stored image. The target pre-stored image may be at least one of the at least one pre-stored image.

According to the embodiments of the present disclosure, the second target image may be obtained according to the at least one pre-stored image, which may include that the second target image is obtained according to the target pre-stored image used to obtain the first target image. The second target image may be obtained according to another pre-stored image. Another pre-stored image may refer to at least one pre-stored image other than the target pre-stored image in the at least one pre-stored image.

According to the embodiments of the present disclosure, the size of the first target image is different from the size of the second target image, and the display position of the first target image in the display picture is different from the display position of the second target image in the display picture. Alternatively, the size of the first target image is different from the size of the second target image, and the display position of the first target image in the display picture is the same as the display position of the second target image in the display picture. For example, the display position information of the first target image includes a same component position information as the display position information of the second target image. Alternatively, the size of the first target image is the same as the size of the second target image, and the display position of the first target image in the display picture is different from the display position of the second target image in the display picture.

According to the embodiments of the present disclosure, a relationship between the first target image and the second target image may include at least one of a rotation relationship, a scaling relationship, a translation relationship, or other relationships.

According to the embodiments of the present disclosure, the first region may refer to a region located within the outer contour of the first target image and not overlapping with the second target image. It should be noted that in a case that an outer contour line of the first target image is a part of the first target image, the region within the outer contour of the first target image may include a region where the outer contour line of the first target image is located. The first region may be determined according to a first parameter information of the first target image and a second parameter information of the second target image. The first parameter information may refer to a parameter information related to the display position of the first target image. The second parameter information may refer to a parameter information related to the display position of the second target image. For example, the first parameter information may include a first position information. Alternatively, the first parameter information may include a second position information and a first size information. Alternatively, the first parameter information may include a seventeenth position information and a first angle information. The second parameter information may include a third position information. Alternatively, the second parameter information may include a fourth position information and a second size information. Alternatively, the second parameter information may include an eighteenth position information and a second angle information. In addition, the first parameter information may further include the head address of the first target image, and the second parameter information may further include the head address of the second target image. When it is determined that the first target image is stored in the memory 201, the first target image may be acquired from the memory 201 according to the head address of the first target image. When it is determined that the second target image is stored in the memory 201, the second target image may be acquired from the memory 201 according to the head address of the second target image.

According to the embodiments of the present disclosure, the first region may include at least one first sub-region. The first sub-region may be obtained by dividing the first region according to a positional relationship between the first region and the second target image.

According to the embodiments of the present disclosure, the first control instruction may refer to a control instruction for a complete process of the controller 202 controlling the display module 203 to switch from the first target image to the second target image and completely hide all parts of the first target image. The frame displayed after switching from the first target image to the second target image may refer to a frame in which the second target image is first displayed during the process of switching from the first target image to the second target image.

For example, the first region may include at least one of a first sub-region A1, a first sub-region A2, a first sub-region A3, and a first sub-region A4. In the frame displayed after switching from the first target image to the second target image, the second target image may be displayed, and a display of the first sub-region A1 may be hidden. Alternatively, in the frame displayed after switching from the first target image to the second target image, the second target image may be displayed, and a display of the first sub-region A1 and the first sub-region A2 may be hidden. Alternatively, in the frame displayed after switching from the first target image to the second target image, the second target image may be displayed, and a display of the first sub-region A1, the first sub-region A2 and the first sub-region A3 may be hidden. Alternatively, in the frame displayed after switching from the first target image to the second target image, the second target image may be displayed, and a display of the first region may be hidden.

According to the embodiments of the present disclosure, a display content of the display picture of the display module 203 in the frame displayed after switching from the first target image to the second target image may be determined according to a processing speed of the controller 202. For example, the operations of hiding the display of each first sub-region in the first region are sequentially performed step by step. For example, the first region may include the first sub-region A1, the first sub-region A2, the first sub-region A3, and the first sub-region A4. The controller 202 may eliminate the first sub-region A1, the first sub-region A2, the first sub-region A3 and the first sub-region A4 in a predetermined order. For example, the first sub-region may be set to be consistent with a bottom color of the second target image or a predetermined background color. In a case of a high processing speed of the controller 202, the controller 202 may control the display module 203, according to the first control instruction, to display the second target image and hide the display of the first sub-region A1, the first sub-region A2, the first sub-region A3 and the first sub-region A4. Accordingly, in the frame displayed after switching from the first target image to the second target image, the first target image is completely hidden on the display module 203. For example, in a case of a low processing speed of the controller 202, the controller 202 may control the display module 203, according to the first control instruction, to only hide the display of at least one of the first sub-region A1, the first sub-region A2, the first sub-region A3 and the first sub-region A4. Accordingly, in the frame displayed after switching from the first target image to the second target image, the second target image and the other first sub-regions in the first target image that are not hidden are presented on the display module 203.

It may be understood that the processing speed of the controller 202 may also determine that in the frame displayed after switching from the first target image to the second target image, the second target image and the other two or three first sub-regions in the first target image that are not hidden are presented on the display module 203.

It may be understood that the first region may only include at least one of the first sub-region A1, the first sub-region A2, the first sub-region A3, or the first sub-region A4. In this case, the controller 202 may perform a determination operation of determining the number of first sub-regions in the first region, and only process an existing first sub-region, so as to improve a processing efficiency.

It may be understood that an order in which the controller 202 processes the first sub-regions in the first region may be determined according to actual service needs and is not limited here.

According to the embodiments of the present disclosure, the controller 202 may generate the first control instruction upon a detection of switching from the first target image to the display of the second target image. The controller 202 may control the display module 203, according to the first control instruction, to display the second target image and hide the display of at least one first sub-region in the first region in the frame displayed after switching from the first target image to the second target image, so that the second target image may cover the overlapping region between the first target image and the second target image, and that the at least one first sub-region in the first region is not displayed on the display module 203 when the second target image is displayed on the display module 203. It should be noted that hiding the display of the first sub-region may mean that a color of the first sub-region is consistent with a bottom color of the second target image or a predetermined background color. The bottom color of the second target image may be the predetermined background color.

For example, the controller 202 may control the display module 203, according to the first control instruction, to display the second target image in the frame displayed after switching from the first target image to the second target image, and call a background painting routine to set a pixel value of the at least one first sub-region to be consistent with a pixel value of the bottom color of the second target image or a pixel value of the predetermined background.

The controller controlling the display module, according to the first control instruction, to display the second target image and hide the display of at least one first sub-region in the first region according to the embodiments of the present disclosure will be further described below with reference to FIG. 2B in combination with specific embodiments.

Figure 2B:
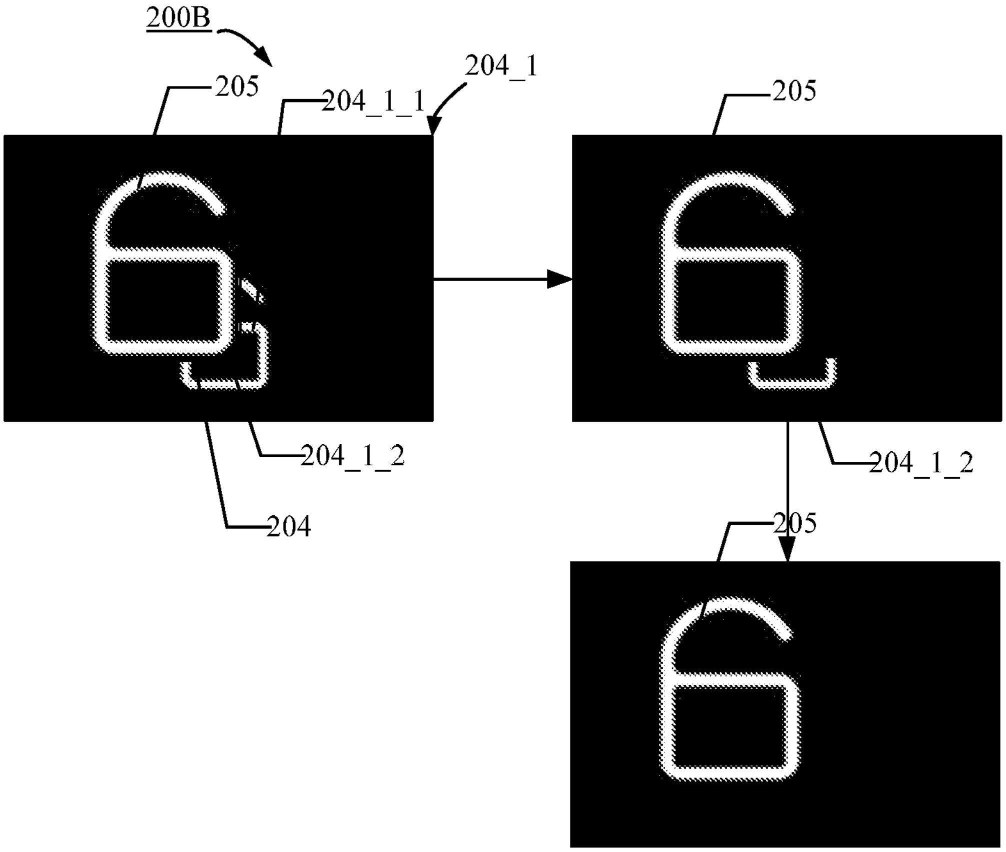
FIG. 2B schematically shows an example schematic diagram of a controller controlling the display module, according to the first control instruction, to display a second target image and hide a display of at least one first sub-region in a first region according to the embodiments of the present disclosure.

FIG. 2B schematically shows an example schematic diagram of the controller controlling the display module, according to the first control instruction, to display the second target image and hide the display of at least one first sub-region in the first region according to the embodiments of the present disclosure.

As shown in FIG. 2B, in 200B, a region located within the outer contour of the first target image 204 and not overlapping with the second target image 205 is a first region 204_1. The first region 204_1 may include a first sub-region 204_1_1 and a first sub-region 204_1_2. As shown in FIG. 2B, the first sub-region 204_1_1 is located on a right side of the second target image 205, and the first sub-region 204_1_2 is located on a lower side of the second target image 205.

The controller may control the display module to display in the following order according to the first control instruction: displaying the second target image 205 and maintaining the display of the first region 204_1; hiding the display of the first sub-region 204_1_1; hiding the display of the first sub-region 204_1_2. In the frame displayed after switching from the first target image to the second target image, the display module 203 displays the second target image and hides the display of the first sub-region 204_1_1. Alternatively, in the frame displayed after switching from the first target image to the second target image, the display module 203 displays the second target image and hides the display of the first region 204_1.

According to the embodiments of the present disclosure, since the controller controls the display module to display the second target image according to the first control instruction, the second target image may directly cover the overlapping region between the first target image and the second target image in the frame displayed after switching from the first target image to the second target image, so that the flickering process from bright to dark and then to bright during the switching from the first target image to the second target image may be effectively avoided, thereby improving a display effect and a user viewing experience.

According to the embodiments of the present disclosure, the contour shape of the pre-stored image may be a rectangle.

According to the embodiments of the present disclosure, a size of the pre-stored image is less than a size of the display picture of the display module.

According to the embodiments of the present disclosure, the pre-stored image may be obtained by performing an image compression on the original image. For example, the image compression may include at least one of clipping or capturing. The size of the pre-stored image is less than the size of the original image. The size of the original image may be less than or equal to the size of the display picture of the display module. The pre-stored image may include a valid information of the original image.

According to the embodiments of the present disclosure, the pre-stored image may be obtained by clipping the original image based on an edge contour of the valid information of the original image. Alternatively, the controller 202 may clip the original image based on a predetermined clipping box to obtain the pre-stored image. The valid information of the original image may be determined according to a pixel value of a pixel in the original image. A shape of the predetermined clipping box may be determined according to actual service needs and is not limited here. For example, the shape of the predetermined clipping box may include a rectangle.

According to the embodiments of the present disclosure, a format of the original image may be determined according to actual service needs and is not limited here. For example, the format of the original image may include BMP (i.e., Bitmap).

According to the embodiments of the present disclosure, the pre-stored image may be stored in a binary file in the memory 201. The binary file may include a bin (i.e., binary) file.

Obtaining the pre-stored image by performing an image clipping on the original image according to the embodiments of the present disclosure will be further described below with reference to FIG. 3A and FIG. 3B in conjunction with specific embodiments.

Figure 3A:
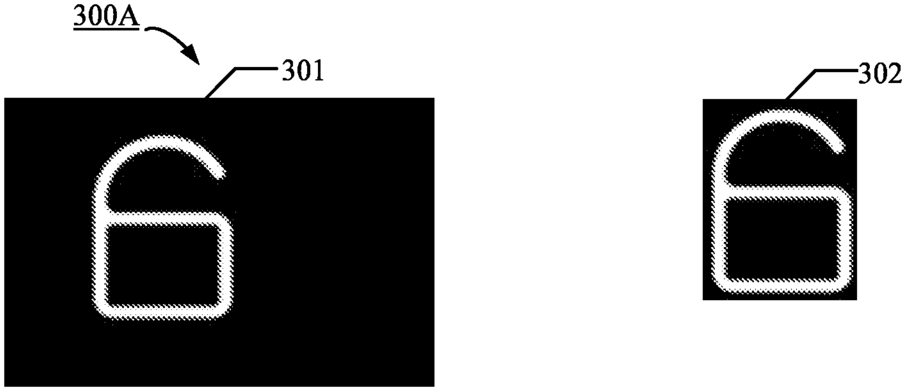
FIG. 3A schematically shows an example schematic diagram of obtaining a pre-stored image by performing an image clipping on an original image according to the embodiments of the present disclosure.

FIG. 3A schematically shows an example schematic diagram of obtaining the pre-stored image by performing an image clipping on the original image according to the embodiments of the present disclosure.

As shown in FIG. 3A, in 300A, the parameter information of an original image 301 may include a component position information, a size information and a head address of the original image. The component position information of the original image 301 includes a horizontal coordinate of a lower left vertex and a vertical coordinate of the lower left vertex of the original image 301. The size information of the original image 301 may include a width information and a height information of the original image 301. The horizontal coordinate of the lower left vertex of the original image 301 is “800”. The vertical coordinate of the lower left vertex of the original image 301 is “480”. The width information of the original image 301 is “800”. The height information of the original image 301 is “480”. A storage space occupied by the original image 301 is “1.152 MB=$800\times480\times3\times10^{-6}$ MB”. The head address of the original image 301 is “0x00119400”.

The parameter information of a pre-stored image 302 may include a component position information, a size information and a head address of the pre-stored image 302. The pre-stored image 302 may be obtained by clipping the original image 301. The width information of the pre-stored image 302 is “168”. The height information of the pre-stored image 302 is “168”. The horizontal coordinate of the lower left vertex of the pre-stored image 302 is “316=(800−168)/2”. The vertical coordinate of the lower left vertex of the pre-stored image 302 is “156=(480−168)/2”. The storage space occupied by the pre-stored image 302 is “84.672 KB=$168\times168\times3\times10^{-3}$ KB”. The head address of the pre-stored image 302 is “0x00014AC0”.

According to the storage space “1.152 MB” occupied by the original image 301 and the storage space “84.672 KB” occupied by the pre-stored image 302, it may be concluded that the storage space occupied by the pre-stored image 302 is reduced by performing an image clipping on the original image 301.

Figure 3B:
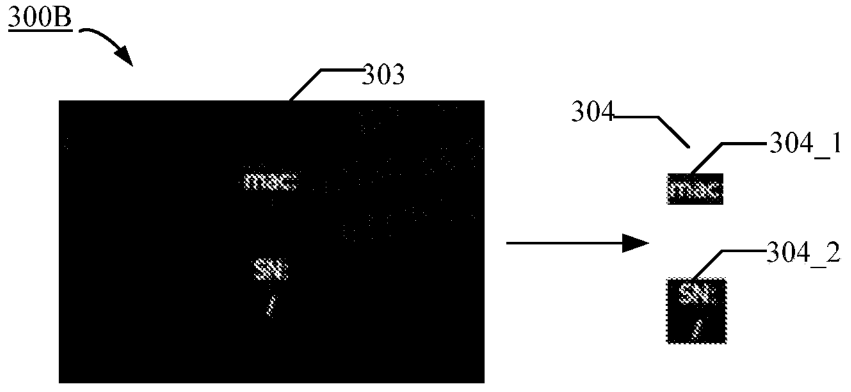
FIG. 3B schematically shows an example schematic diagram of obtaining the pre-stored image by performing an image clipping on the original image according to other embodiments of the present disclosure.

FIG. 3B schematically shows an example schematic diagram of obtaining the pre-stored image by performing an image clipping on the original image according to other embodiments of the present disclosure.

As shown in FIG. 3B, in 300B, the parameter information of an original image 303 may include a component position information and a size information of the original image 303. The component position information of the original image 303 includes a horizontal coordinate of a lower left vertex and a vertical coordinate of the lower left vertex of the original image 303. The size information of the original image 303 may include a width information and a height information of the original image 303. The horizontal coordinate of the lower left vertex of the original image 303 is “800”. The vertical coordinate of the lower left vertex of the original image 303 is “480”. The width information of the original image 303 is “800”. The height information of the original image 303 is “480”. A storage space occupied by the original image 303 is “1.152 MB=$800\times480\times3\times10^{-6}$ MB”.

The parameter information of a pre-stored image 304 may include a component position information and a size information of the pre-stored image 304. The pre-stored image 304 may be obtained by performing an image clipping on the original image 304. The pre-stored image 304 may include a pre-stored sub-image 304_1 and a pre-stored sub-image 304_2. The width information of the pre-stored sub-image 304_1 and the width information of the pre-stored sub-image 304_2 are “100” and “100” respectively. The height information of the pre-stored sub-image 304_1 and the height information of the pre-stored sub-image 304_2 are “60” and “110” respectively. The horizontal coordinate of the lower left vertex of the pre-stored sub-image 304_1 and the horizontal coordinate of the lower left vertex of the pre-stored sub-image 304_2 are “350=(800−100)/2” and “350=(800−100)/2”, respectively. The vertical coordinate of the lower left vertex of the pre-stored sub-image 304_1 and the vertical coordinate of the lower left vertex of the pre-stored sub-image 304_2 are “210=(480−60)/2” and “135=(480−110)/2”, respectively. The storage space occupied by the pre-stored sub-image 304_1 and the storage space occupied by the pre-stored sub-image 304_2 are "18 KB=100×60×3×$10^{-3}$ KB" and "33 KB=100×110×3×$10^{-3}$ KB", respectively.

According to the storage space "1.152 MB" occupied by the original image 303 and the storage space "51 KB=(18+33) KB" occupied by the pre-stored image 304, it may be concluded that the storage space occupied by the pre-stored image 304 is reduced by performing an image clipping on the original image 303.

According to the embodiments of the present disclosure, an expected storage space occupied by the original image may be determined according to a resolution information (i.e., size information) of the display screen of the display module and an interface complexity of UI (User Interface). When it is determined that an actual storage space of the memory 201 is less than the expected storage space, it may be determined that the storage space of the original image is reduced by using a compression algorithm. For example, the storage space occupied by the original image is 1.152 MB, and the storage space occupied by the pre-stored image obtained by clipping the original image is 84.672 KB. The storage space occupied by the original image is 1.152 MB, and the storage space occupied by the pre-stored image obtained by clipping the original image is 33 KB.

According to the embodiments of the present disclosure, by clipping the original image to obtain the pre-stored image stored in the memory, the storage space for the pre-stored image is reduced, thereby maximizing a utilization of the storage space of the memory and reducing a storage cost.

According to the embodiments of the present disclosure, the controller 202 may control the display module 203 to display a first background while displaying the first target image, and a color of the first background at a periphery of the first target image is consistent with a bottom color of the first target image; and/or the controller 202 may control the display module 203 to display a second background while displaying the second target image, and a color of the second background at a periphery of the first target image is consistent with a bottom color of the second target image.

According to the embodiments of the present disclosure, the bottom color of the first target image may be the same as or different from the bottom color of the second target image. The periphery of the first target image may refer to a nearby region outside the outer contour of the first target image. The nearby region may correspond to a predetermined number of pixels. The predetermined number may be determined according to actual service needs and is not limited here. For example, the predetermined number may be 4.

According to the embodiments of the present disclosure, the controller 202 may control the display module 203, according to the first control instruction, to display the second target image and continue to display at least one first sub-region in the frame displayed after switching from the first target image to the second target image.

According to the embodiments of the present disclosure, the controller 202 may control the display module 203, according to the first control instruction, to display the second target image and maintain a display state of the at least one first sub-region in the first region in the frame displayed after switching from the first target image to the second target image, that is, in the frame displayed after switching from the first target image to the second target image, the second target image and at least one first sub-region in the first region are displayed on the display module 203, so that the second target image may directly cover the overlapping region between the first target image and the second target image, and that the at least one first sub-region in the first region is kept in the display state. This reflects a process of the controller 202 processing the first target image. Moreover, by keeping the display state of the at least one first sub-region in the display region, a smooth appearance may not be affected when switching to the target image, and a high level of display effect may be maintained.

According to the embodiments of the present disclosure, the first target image may be obtained according to a target pre-stored image, and the second target image may be obtained according to a pre-stored image different from the target pre-stored image. The target pre-stored image may be one of the at least one pre-stored image. Alternatively, the first target image and the second target image may be obtained according to a same pre-stored image.

According to the embodiments of the present disclosure, obtaining the first target image according to the target pre-stored image may include one of the following: the first target image is the target pre-stored image or the first target image is obtained by processing the target pre-stored image.

According to the embodiments of the present disclosure, the target pre-stored image may be one of the at least one pre-stored image stored in the memory 201.

According to the embodiments of the present disclosure, obtaining the second target image according to the target pre-stored image used to obtain the first target image may include one of the following: the second target image is the target pre-stored image, or the second target image is obtained by processing the target pre-stored image.

According to the embodiments of the present disclosure, obtaining the second target image according to another pre-stored image may include one of the following: the second target image is another pre-stored image, or the second target image is obtained by processing another pre-stored image. Another pre-stored image may refer to a pre-stored image different from the target pre-stored image. In this case, a plurality of pre-stored images are stored in the memory 201. The plurality of pre-stored images may include the target pre-stored image and the another pre-stored image.

According to the embodiments of the present disclosure, obtaining the first target image and the second target image according to the same target pre-stored image may include one of the following: the second target image is the target pre-stored image, or the second target image is obtained by processing the target pre-stored image.

According to the embodiments of the present disclosure, obtaining the first target image according to the target pre-stored image may include at least one of the following: the first target image may be obtained by rotating the target pre-stored image, the first target image may be obtained by scaling the target pre-stored image, or the first target image may be obtained by translating the target pre-stored image.

According to the embodiments of the present disclosure, obtaining the second target image according to the target pre-stored image may include at least one of the following: the second target image may be obtained by rotating the target pre-stored image, the second target image may be obtained by scaling the target pre-stored image, or the second target image may be obtained by translating the target pre-stored image.

According to the embodiments of the present disclosure, obtaining the second target image according to another pre-stored image may include at least one of the following: the second target image may be obtained by rotating another pre-stored image, the second target image may be obtained by scaling another pre-stored image, or the second target image may be obtained by translating another pre-stored image.

According to the embodiments of the present disclosure, the controller 202 may determine a first region according to a first parameter information of the first target image and a second parameter information of the second target image, and generate a first control instruction according to the first parameter information of the first region, the second target image, and the second parameter information.

According to the embodiments of the present disclosure, the first parameter information may include a first position information. Alternatively, the first parameter information may include a second position information and a first size information. The second parameter information may include a third position information. Alternatively, the second parameter information may include a fourth position information and a second size information.

According to the embodiments of the present disclosure, the first position information may refer to a position information according to which the display position of the first target image in the display module 203 may be directly determined without combining with other information. The third position information may refer to a position information according to which the display position of the second target image in the display module 203 may be directly determined without combining with other information. The first position information and the third position information may refer to the above-mentioned complete position information. Other information may include at least one of a size information and an angle information.

According to the embodiments of the present disclosure, the second position information may refer to a position information that needs to be combined with the first size information to determine the display position of the first target image on the display module 203. The fourth position information may refer to a position information that needs to be combined with the second size information to determine the display position of the second target image on the display module 203.

According to the embodiments of the present disclosure, the controller 202 may determine the first region between the first target image and the second target image according to the first parameter information and the second parameter information.

According to the embodiments of the present disclosure, the controller 202 may determine a positional relationship between the first region and the second target image according to the second parameter information and the first parameter information of the first region. When it is determined that the first region includes a first target sub-region according to the positional relationship, the controller 202 controls the display module 203, according to the first control instruction, to display the second target image and hide the display of the first target sub-region. Alternatively, when it is determined that the first region includes the first target sub-region and a second target sub-region according to the positional relationship, the controller 202 controls the display module 203, according to the first control instruction, to display the second target image and hide the display of the first target sub-region and the second target sub-region. Alternatively, when it is determined that the first region includes the first target sub-region, the second target sub-region and a third target sub-region according to the positional relationship, the controller 202 controls the display module 203, according to the first control instruction, to display the second target image and hide the display of the first target sub-region, the second target sub-region and the third target sub-region. Alternatively, when it is determined that the first region includes the first target sub-region, the second target sub-region, the third target sub-region and a fourth target sub-region according to the positional relationship, the controller 202 controls the display module 203, according to the first control instruction, to display the second target image and hide the display of the first target sub-region, the second target sub-region, the third target sub-region and the fourth target sub-region.

According to the embodiments of the present disclosure, the first target sub-region may be a first sub-region located on a side of the second target image in a first direction, the second target sub-region may be a first sub-region located on a side of the second target image in a second direction, the third target sub-region may be a first sub-region located on a side of the second target image in a third direction, and the fourth target sub-region may be a first sub-region located on a side of the second target image in a fourth direction.

According to the embodiments of the present disclosure, the first direction and the third direction may be perpendicular to each other, and the second direction and the fourth direction may be perpendicular to each other. Alternatively, the first direction and the second direction may be perpendicular to each other, and the third direction and the fourth direction may be perpendicular to each other. Alternatively, the first direction and the fourth direction may be perpendicular to each other, and the second direction and the third direction may be perpendicular to each other.

According to the embodiments of the present disclosure, the first target sub-region may be a first sub-region located on a side of the second target image in the first direction, and the second target sub-region may be a first sub-region located on a side of the second target image in the second direction. When the controller 202 performs the operations of hiding the display of the first sub-region in the order from the first target sub-region to the second target sub-region, if there is an overlapping region between the first target sub-region and the second target sub-region, the operations may be performed by at least four processing methods as follows.

Method 1: The overlapping region is hidden during the process of hiding the display of the first target sub-region, and in a case of performing the operation of hiding the display of the second target sub-region, the display of the second target sub-region is hidden. That is, the operation of hiding the display of the overlapping region is repeatedly performed.

Method 2: The controller 202 may determine a region in the second target sub-region not overlapping with the first target sub-region according to the first parameter information of the first target sub-region and the first parameter information of the second target sub-region. The controller 202 may control the display module 203 to hide the display of the first target sub-region and hide the display of the region in the second target sub-region not overlapping with the first target sub-region. That is, when performing the operation of hiding the display of the second target sub-region, the controller 202 hides the display of the region in the second target sub-region not overlapping with the first target sub-region, and the operation of hiding the display of the overlapping region between the second target image and the first target image is not repeatedly performed.

Method 3: The controller 202 may determine a region in the first target sub-region not overlapping with the second target sub-region according to the first parameter information of the first target sub-region and the first parameter information of the second target sub-region. The controller 202 may control the display module 203 to hide the display of the region in the first target sub-region not overlapping with the second target sub-region and hide the display of the second target sub-region. That is, when performing the operation of hiding the display of the first target sub-region, the controller 202 hides the display of the region in the first target sub-region not overlapping with the second target sub-region, and the operation of hiding the display of the overlapping region between the second target image and the first target image is not repeatedly performed.

Method 4: It is possible to predetermine which first sub-region the overlapping region between the two first sub-regions belongs to. For the overlapping region between the first target sub-region and the second target sub-region, it may be predetermined whether the overlapping region belongs to the first target sub-region or the second target sub-region. If the overlapping region belongs to the first target sub-region, the controller 202 may control the display module 203 to hide the display of the first target sub-region and hide the display of a sub-region other than the overlapping region in the second target sub-region. If the overlapping region belongs to the second target sub-region, the controller 202 may control the display module 203 to hide the display of a sub-region other than the overlapping region in the first target sub-region and hide the display of the second target sub-region. In this way, the operation of hiding the display of the overlapping region may be performed once only.

According to the embodiments of the present disclosure, the first direction and the second direction are perpendicular to each other. For example, the first direction of the second target image is a direction toward a right side of the second target image, and the second direction of the second target image is a direction toward a lower side of the second target image.

For example, the first direction of the second target image is the direction toward the right side of the second target image, and the second direction of the second target image is the direction toward the lower side of the second target image. One or more first sub-regions are respectively located on the sides of the second target image in the first target direction, the second target direction, the third target direction, and the fourth target direction.

According to the embodiments of the present disclosure, two of the first direction, the second direction, the third direction and the fourth direction are parallel to a row extension direction of a pixel arrangement of the second target image, and the other two are parallel to a column extension direction of the pixel arrangement of the second target image.

For example, the first direction and the third direction may be parallel to the row extension direction of the pixel arrangement of the second target image. The second direction and the fourth direction may be parallel to the column extension direction of the pixel arrangement of the second target image.

For example, the first direction for the second target image may be the direction toward the right side of the second target image, the second direction for the second target image may be the direction toward the lower side of the second target image, the third direction for the second target image may be the direction toward the left side of the second target image, and the fourth direction for the second target image may be the direction toward the upper side of the second target image. According to the embodiments of the present disclosure, two of the first direction, the second direction, the third direction and the fourth direction are parallel to each other, and the other two are parallel to each other.

The controller controlling the display module, according to the first control instruction, to display the second target image and hide the display of at least one first sub-region in the first region according to the embodiments of the present disclosure will be further described below with reference to FIG. 4A, FIG. 4B and FIG. 4C in combination with specific embodiments.

Figure 4A:
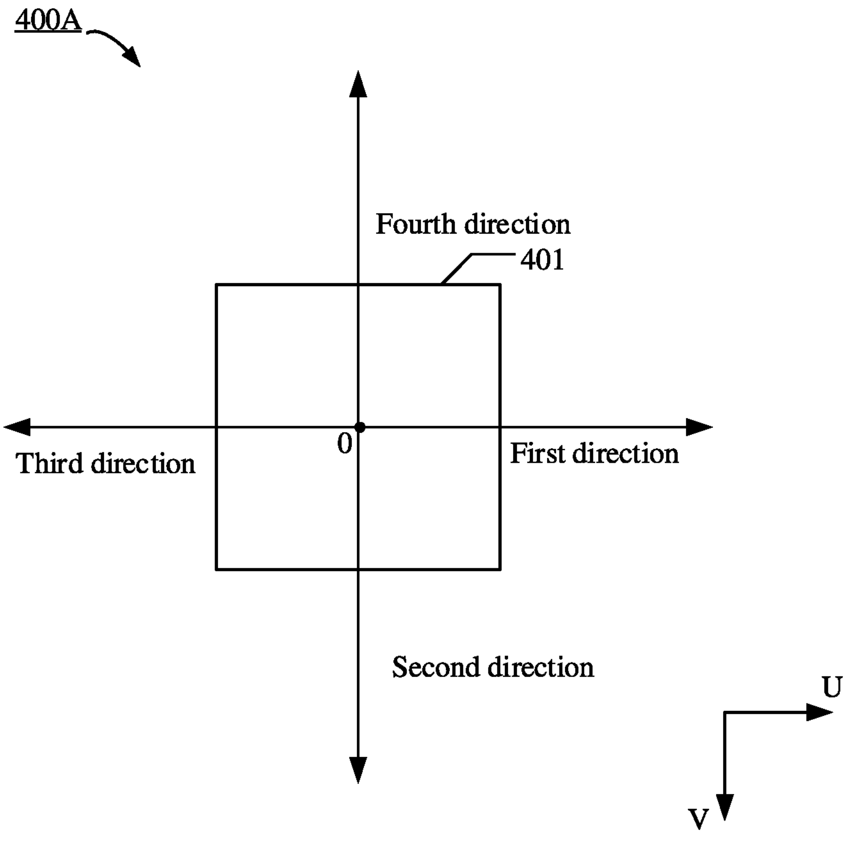
FIG. 4A schematically shows an example schematic diagram of a first direction, a second direction, a third direction, and a fourth direction according to the embodiments of the present disclosure.

FIG. 4A schematically shows an example schematic diagram of the first direction, the second direction, the third direction and the fourth direction according to the embodiments of the present disclosure.

As shown in FIG. 4A, in 400A, a coordinate system may include U-axis and V-axis. The U-axis may refer to the row extension direction of the pixel arrangement of the second target image 401. The V-axis may refer to the column extension direction of the pixel arrangement of the second target image 401. A positive direction of the U-axis (i.e., the direction indicated by "→") may refer to the first direction. A negative direction of the U-axis (i.e., the direction opposite to "→") may refer to the third direction. A positive direction of the V-axis (i.e., the direction indicated by "→") may refer to the second direction. A negative direction of the V-axis (i.e., the direction opposite to "→") may refer to the fourth direction.

The first target sub-region may be a first sub-region located on the side of the second target image 401 in the first direction, the second target sub-region may be a first sub-region located on the side of the second target image 401 in the second direction, the third target sub-region may be a first sub-region located on the side of the second target image 401 in the third direction, and the fourth target sub-region may be a first sub-region located on the side of the second target image 401 in the fourth direction.

Figure 4B:
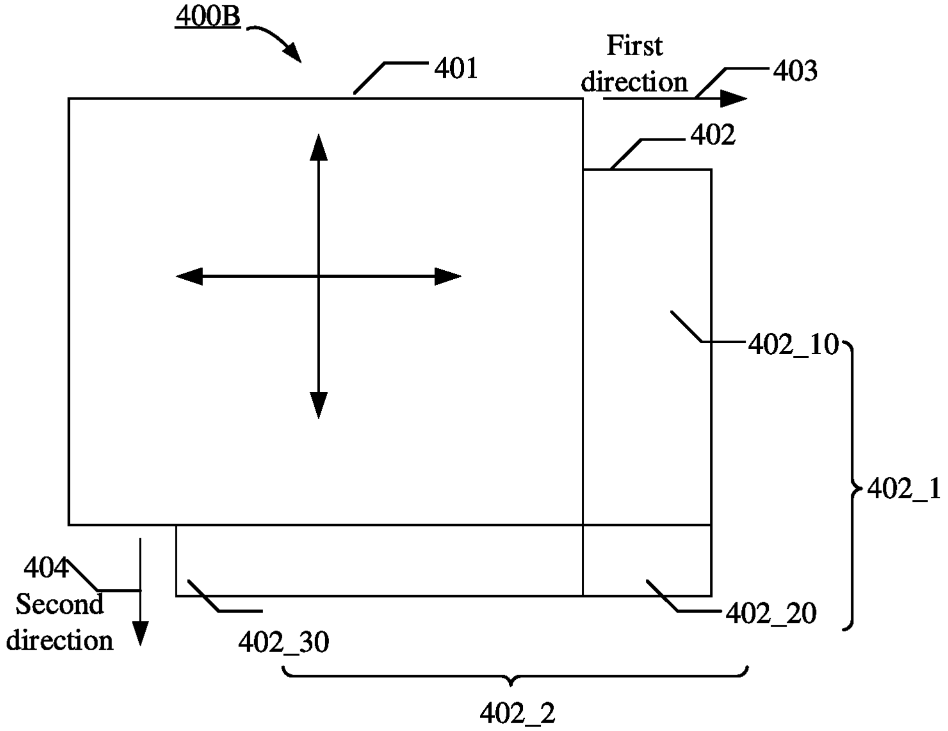
FIG. 4B schematically shows an example schematic diagram of the controller controlling the display module, according to the first control instruction, to hide a display of a first target sub-region and a second target sub-region in a case that the first target sub-region and the second target sub-region have an overlapping region according to the embodiments of the present disclosure.

FIG. 4B schematically shows an example schematic diagram of the controller controlling, according to the first control instruction, to hide the display of the first target sub-region and the second target sub-region in a case of an overlapping region between the first target sub-region and the second target sub-region according to the embodiments of the present disclosure.

As shown in FIG. 4B, on the basis of FIG. 4A, in 400B, a first target sub-region 402_1 is the first sub-region located on the side of the second target image 401 in the first direction, and a second target sub-region 402_2 is the first sub-region located on the side of the second target image 401 in the second direction. A first direction 403 and a second direction 404 are perpendicular to each other. The first direction 403 may be parallel to the row extending direction of the pixel arrangement of the second target image 401, and the second direction 404 may be parallel to the column extending direction of the pixel arrangement of the second target image 402.

The first region may represent a region located within the outer contour of the first target image 402 and not overlapping with the second target image 401. The first region may include the first target sub-region 402_1 and the first target sub-region 402_2.

The first target sub-region 402_1 may include a non-overlapping region 402_10 and an overlapping region 402_20. The second target sub-region 402_2 may include a non-overlapping region 402_30 and the overlapping region 402_20. The overlapping region 402_20 may be the overlapping region between the first target sub-region 402_1 and the second target sub-region 402_2.

It may be predetermined whether the overlapping region 402_20 belongs to the first target sub-region 402_1 or the second target sub-region 402_2. When the overlapping region 402_20 belongs to the first target sub-region 402_1, the controller may control the display module to hide the display of the first target sub-region 402_1 and hide the display of the non-overlapping region 402_30. When the overlapping region 402_20 belongs to the second target sub-region 402_2, the controller may control the display module to hide the display of the non-overlapping regions 402_10 and hide the display of the second target sub-region 402_2.

In this way, the operation of hiding the display of the overlapping region 402_20 may be performed once only, so that the display efficiency may be improved.

Figure 4C:
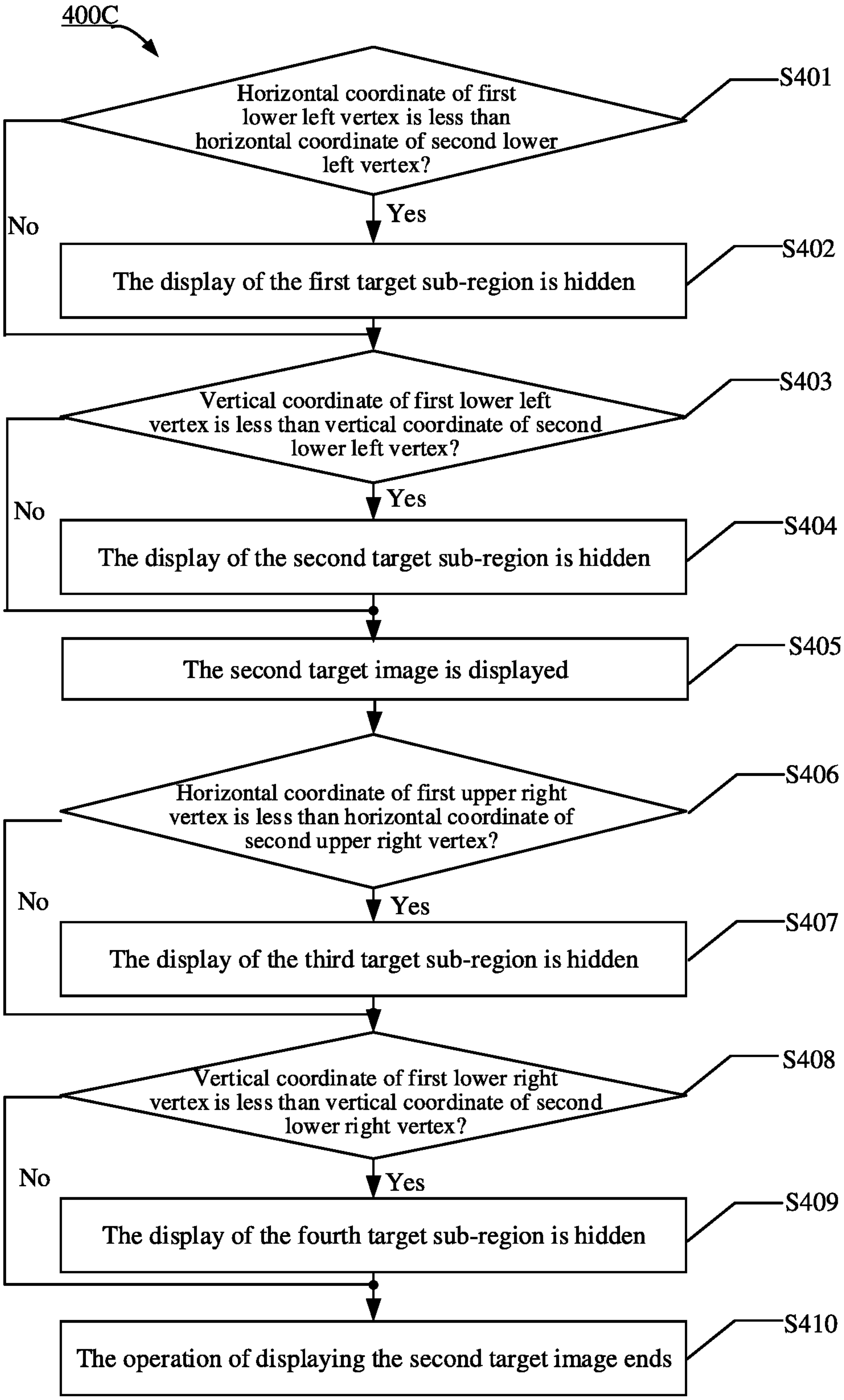
FIG. 4C schematically shows a flowchart of the controller controlling the display module, according to the first control instruction, to display a second target image and hide a display of at least one first sub-region in the first region according to the embodiments of the present disclosure.

FIG. 4C schematically shows a flowchart of the controller controlling the display module, according to the first control instruction, to display the second target image and hide the display of at least one first sub-region in the first region according to the embodiments of the present disclosure.

As shown in FIG. 4C, a method 400C includes operations S401 to S410.

In operation S401, it is determined whether a horizontal coordinate of a first lower left vertex is less than a horizontal coordinate of a second lower left vertex. If so, the process proceeds to operation S402; if not, the process proceeds to operation S403.

In operation S402, the display of the first target sub-region is hidden.

In operation S403, it is determined whether a vertical coordinate of the first lower left vertex is less than a vertical coordinate of the second lower left vertex. If so, the process proceeds to operation S404; if not, the process proceeds to operation S405.

In operation S404, the display of the second target sub-region is hidden.

In operation S405, the second target image is displayed.

In operation S406, it is determined whether a horizontal coordinate of a first upper right vertex is less than a horizontal coordinate of a second upper right vertex. If so, the process proceeds to operation S407; if not, the process proceeds to operation S408.

In operation S407, the display of the third target sub-region is hidden.

In operation S408, it is determined whether a vertical coordinate of a first lower right vertex is less than a vertical coordinate of a second lower right vertex. If so, the process proceeds to operation S409; if not, the process proceeds to operation S410.

In operation S409, the display of the fourth target sub-region is hidden.

In operation S410, the operation of displaying the second target image ends.

According to the embodiments of the present disclosure, the controller 202 may control the display module 203, according to the first control instruction, to display the second target image and hide the display of at least partial region on the side of the second target image in the first direction. Alternatively, the controller 202 may control the display module 203, according to the first control instruction, to display the second target image and hide the display of at least partial regions on the sides of the second target image in the first direction and the second direction. Alternatively, the controller 202 may control the display module 203, according to the first control instruction, to display the second target image and hide the display of at least partial regions on the sides of the second target image in the first direction, the second direction and the third direction. Alternatively, the controller 202 may control the display module 203, according to the first control instruction, to display the second target image and hide the display of at least partial regions on the sides of the second target image in the first direction, the second direction, the third direction and the fourth direction. Alternatively, the controller 202 may control the display module 203, according to the first control instruction, to display the second target image and hide the display of the first region.

According to the embodiments of the present disclosure, two of the first direction, the second direction, the third direction and the fourth direction are parallel to the row extending direction of the pixel arrangement of the second target image, and the other two are parallel to the column extending direction of the pixel arrangement of the second target image.

According to the embodiments of the present disclosure, the controller 202 may control the display module 203, according to the first control instruction, to display the second target image and hide the display of the first sub-region in a translation direction when it is determined, according to the positional relationship, that the first target image and the second target image have the translation relationship.

According to the embodiments of the present disclosure, when it is determined that the first target image and the second target image have the translation relationship according to the positional relationship, the controller 202 controls the display module 203 to display the second target image and hide the display of the first sub-region in the translation direction according to the first control instruction, and does not need to perform an operation of determining a presence of the first sub-region in other directions, so that the processing efficiency of the controller 203 may be improved.

When a frame of display picture contains a plurality of target images, if the controller sequentially controls the display module to display each target image according to an execution order, a display order of each target image may be recognized by the user, resulting in a sense of image loading.

In view of this, the embodiments of the present disclosure propose an effective technical solution to avoid the sense of image loading. For example, the controller 202 may include a display buffer and a processor. The display buffer may store a plurality of target images. The processor may generate a second control instruction for the plurality of target images in response to a detection of a synchronous display instruction, and control the display module 203, according to the second control instruction, to synchronously display the plurality of target images in a same frame of display picture.

According to the embodiments of the present disclosure, the plurality of target images may be stored according to respective third parameter information of the plurality of target images. The third parameter information may include a fifth position information. Alternatively, the third parameter information may include a sixth position information and a third size information.

According to the embodiments of the present disclosure, the synchronous display instruction may refer to an instruction for switching to the plurality of target images in the same frame of display picture. A synchronous display may refer to switching to the plurality of target images in the same frame of display picture. In a frame before the same frame, none of the plurality of target images is displayed in the display picture, or in the frame before the same frame, N target images among M target images are displayed in the display picture, where M-N may be greater than or equal to 2, and M may represent a number of the plurality of target images.

According to the embodiments of the present disclosure, the processor may generate the second control instruction for the plurality of target images upon a detection of the synchronous display instruction. The processor may control the display module 203, according to the second control instruction, to synchronously display the plurality of target images stored in the display buffer in the same frame of display picture.

According to the embodiments of the present disclosure, if the sense of image loading is not obvious to the user during the process of switching to the plurality of target images in the same frame of display picture, it may be indirectly determined that the above-mentioned effective technical solution to avoid the sense of image loading has been adopted.

According to the embodiments of the present disclosure, the processor controls the display module, according to the second control instruction, to synchronously display the plurality of target images stored in the display buffer in the same frame of display picture, and the synchronous display of the plurality of target images is achieved, thereby effectively avoiding the sense of image loading caused by sequentially displaying the plurality of target images.

According to the embodiments of the present disclosure, the processor may generate a sixth control instruction according to the plurality of target images and respective third parameter information of the plurality of target images, and store, according to the sixth control instruction, the plurality of target images in the display buffer according to the respective third parameter information of the plurality of target images.

According to the embodiments of the present disclosure, the third parameter information of the plurality of target images may include a head address and a fifth position information. Alternatively, the third parameter information may include the head address, a sixth position information, and a third size information. The processor may generate the sixth control instruction according to the plurality of target images and the respective third parameter information of the plurality of target images, and store, according to the sixth control instruction, the plurality of target images in the display buffer according to the respective third parameter information of the plurality of target images.

According to the embodiments of the present disclosure, for a target image in the plurality of target images, the processor may acquire at least one pre-stored image from the memory 201 according to the head address of the target image. The plurality of target images may be obtained according to at least one pre-stored image.

According to the embodiments of the present disclosure, the processor may store the target image in the display buffer according to the fifth position information of the target image. Alternatively, the processor may store the target image in the display buffer according to the sixth position information and the third size information.

According to the embodiments of the present disclosure, the plurality of target images may include a second target image and a third target image.

According to the embodiments of the present disclosure, a size of the third target image may be different from the size of the first target image, and/or a position of the third target image in the display picture may be different from the position of the first target image in the display screen, which may include the following cases.

The size of the third target image is different from the size of the first target image, and the display position of the third target image in the display picture is different from the display position of the first target image in the display picture.

Alternatively, the size of the third target image is different from the size of the first target image, and the display position of the third target image in the display picture is the same as the display position of the first target image in the display picture. For example, the display position information of the third target image includes a same component position information as the display position information of the first target image.

Alternatively, the size of the third target image is the same as the size of the first target image, and the display position of the third target image in the display picture is different from the display position of the first target image in the display picture.

Alternatively, the size of the third target image is the same as the size of the first target image, and the display position of the third target image in the display picture is the same as the display position of the first target image in the display picture.

According to the embodiments of the present disclosure, the size of the third target image may be different from the size of the second target image, and/or the display position of the third target image in the display picture may be different from the display position of the first target image in the display picture, which may include the following cases.

The size of the third target image is different from the size of the second target image, and the display position of the third target image in the display picture is different from the display position of the second target image in the display picture.

Alternatively, the size of the third target image is different from the size of the second target image, and the display position of the third target image in the display picture is the same as the display position of the second target image in the display picture. For example, the display position information of the third target image includes a same component position information as the display position information of the second target image.

Alternatively, the size of the third target image is the same as the size of the second target image, and the display position of the third target image in the display picture is different from the display position of the second target image in the display picture.

According to the embodiments of the present disclosure, the processor may control the display module 203, according to the second control instruction, to synchronously display the second target image and the third target image in the same frame of display picture.

In order to effectively avoid picture flickering, before controlling the display module to display a fifth target image, the controller needs to determine an overlapping region between a fourth target image and the fifth target image and a region located within an outer contour of the fourth target image and not overlapping with the fifth target image. A time consumption for the above process is limited by the processing speed of the controller. Therefore, when it is needed to rapidly display the fifth target image, it is difficult to achieve a rapid display of the fifth target image due to a limitation of the processing speed of the controller.

In view of this, the embodiments of the present disclosure propose a technical solution for rapidly displaying the second target image based on caching and synchronization. For example, the controller 202 may determine a second region based on an initiation identification according to a fourth parameter information of the fourth target image and a fifth parameter information of the fifth target image.

According to the embodiments of the present disclosure, the controller 202 generates a third control instruction according to the fourth parameter information of the second region, the fourth target image, and the fifth parameter information. The controller 202 controls the display module 203, according to the third control instruction, to display the fifth target image and hide the display of at least one second sub-region in the second region in a frame displayed after switching from the fourth target image to the fifth target image.

According to the embodiments of the present disclosure, the controller 202 firstly determines the second region based on the initiation identification according to the fourth parameter information of the fourth target image and the fifth parameter information of the fifth target image, and then generates the third control instruction according to the fourth parameter information of the second region, the fourth target image, and the fifth parameter information.

According to the embodiments of the present disclosure, the initiation identification may indicate an initiation of an operation of processing the fifth target image while the fourth target image is being displayed.

According to the embodiments of the present disclosure, the second region may represent a region located within the outer contour of the fourth target image and not overlapping with the fifth target image.

According to the embodiments of the present disclosure, the fourth parameter information may include a seventh position information. Alternatively, the fourth parameter information may include an eighth position information and a fourth size information.

According to the embodiments of the present disclosure, the fifth parameter information may include a ninth position information. Alternatively, the fifth parameter information may include a tenth position information and a fifth size information.

The second region may indicate a region located within the outer contour of the fourth target image and not overlapping with the fifth target image. The initiation identification may represent an initiation of the operation of processing the fifth target image while the fourth target image is being displayed.

According to the embodiments of the present disclosure, since the controller initiates the operation of processing the fifth target image while the fourth target image is being displayed, the fifth target image may be processed while the fourth target image is being displayed, thereby improving the display smoothness.

In addition, the operation of displaying the fifth target image is initiated after the display of the fourth target image is completed, thereby further improving the display smoothness. The display of the fourth target image being completed may refer to the end of the display of the fourth target image.

According to the embodiments of the present disclosure, a driving signal and a pre-stored image signal exist simultaneously in the process of the controller 202 controlling the display module 203 to display the fourth target image.

According to the embodiments of the present disclosure, a display duration of the fourth target image may be one frame only. That is, in a first predetermined period, only one frame of the complete fourth target image is presented on the display module 203. Since the controller initiates the operation of processing the fifth target image while the fourth target image is being displayed, the fifth target image may be presented completely in a next frame to the fourth target image, thereby improving the display smoothness. The first predetermined period may be determined according to actual service needs and is not limited here. For example, the first predetermined period may be a period of three frames in length.

According to the embodiments of the present disclosure, a display duration of the fifth target image may be one frame only. That is, in a second predetermined period, only one frame of the complete fifth target image is presented on the display module 203. The second predetermined period may be determined according to actual service needs and is not limited here. For example, the second predetermined period may be a period of three frames in length. In addition, the second predetermined period may be the same as or different from the first predetermined period.

In an embodiment, the third control instruction may be the first control instruction when the fourth target image is the first target image and the fifth target image is the second target image.

According to the embodiments of the present disclosure, the driving signal and the pre-stored image signal exist simultaneously in the process of the controller 202 controlling the display module 203 to display the first target image. For example, the driving signal and the pre-stored image signal existing simultaneously may mean that the driving signal and the pre-stored signal may be detected at a same time instant.

According to the embodiments of the present disclosure, the driving signal may represent a signal allowing the controller 202 to drive the display module 203 to display. The pre-stored image signal may represent a signal allowing the memory 201 to transmit the pre-stored image to the controller 202.

According to the embodiments of the present disclosure, the driving signal may include at least one of RGB signal, LVDS (Low Voltage Differential Signaling), or MIPI (Mobile Industry Processor Interface) signal. The pre-stored image signal may include an SPI signal.

According to the embodiments of the present disclosure, the second target image may be obtained by the controller 202 by acquiring the pre-stored image from the memory, and the pre-stored image signal may be generated in an acquisition process. Therefore, in the process of the controller 202 controlling the display module 203 to display the first target image, if the driving signal and the pre-stored image signal exist simultaneously, it may mean that the second target image is processed during the process of displaying the first target image.

According to the embodiments of the present disclosure, since the driving signal and the pre-stored image signal exist simultaneously during the process of the controller controlling the display module to display the first target image, the second target image may be processed during the display of the first target image, thereby improving the display smoothness.

According to the embodiments of the present disclosure, the display duration of the first target image may be one frame only. That is, in a third predetermined period, only one frame of the complete first target image is presented on the display module 203. Since the controller 202 initiates the operation of processing the second target image during the display of the first target image, the second target image may be presented completely in a next frame to the first target image, thereby improving the display smoothness. The third predetermined period may be determined according to actual service needs and is not limited here. For example, the third predetermined period may be a period of three frames in length. In addition, the third predetermined period may be the same as or different from at least one of the first predetermined period or the second predetermined period.

According to the embodiments of the present disclosure, the display duration of the second target image may be one frame only. That is, in a fourth predetermined period, only one frame of the complete second target image is presented on the display module 203. The fourth predetermined period may be determined according to actual service needs and is not limited here. For example, the fourth predetermined period may be a period of three frames in length. In addition, the fourth predetermined period may be the same as or different from at least one of the first predetermined period, the second predetermined period or the third predetermined period.

In an embodiment, the controller 202 may control the display module 203, according to the first control instruction, to display the second target image and completely hide the display of the first region in the frame displayed after switching from the first target image to the second target image.

In an embodiment, while the second target image is being displayed, the controller 202 initiates an operation of processing the third target image, so that the third target image may be presented completely in a next frame to the second target image, thereby improving the display smoothness.

According to the embodiments of the present disclosure, since the display duration of the complete second target image may be one frame, it may maintain the same refresh rate as the display module 203, so that the display is smooth.

The rapid display of the fifth target image by the display device according to the embodiments of the present disclosure will be further described below with reference to FIG. 5 in conjunction with specific embodiments.

Figure 5:
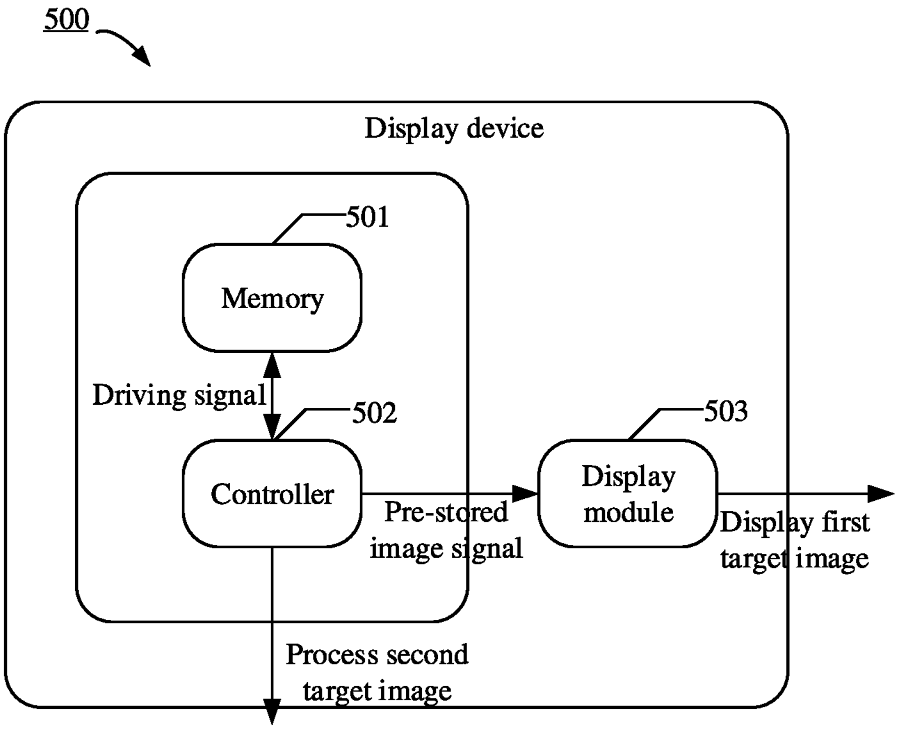
FIG. 5 schematically shows a schematic diagram of a display device rapidly displaying a fifth target image according to the embodiments of the present disclosure.

FIG. 5 schematically shows a schematic diagram of a display device rapidly displaying the fifth target image according to the embodiments of the present disclosure.

As shown in FIG. 5, a display device 500 may include a memory 501, a controller 502, and a display module 503.

The controller 501 may determine a second region based on an initiation identification according to the fourth parameter information of the fourth target image and the fifth parameter information of the fifth target image, generate a third control instruction according to the fourth parameter information of the second region, the fifth target image and the fifth parameter information, and control the display module 203, according to the third control instruction, to display the fifth target image and hide the display of the second region in a frame displayed after switching from the fourth target image to the fifth target image.

According to the embodiments of the present disclosure, the controller 202 may determine, in response to a detection of a switching instruction, an eighth parameter information according to a sixth parameter information of a sixth target image and a seventh parameter information of a seventh target image, obtain an eighth target image according to the eighth parameter information, the sixth target image and the seventh target image, generate a fourth control instruction according to the eighth target image and the eighth parameter information of the eighth target image, and control the display module 203 to display the eighth target image according to the fourth control instruction.

According to the embodiments of the present disclosure, the switching instruction may represent an instruction for switching from the complete display of the sixth target image to the display of the seventh target image. The sixth target image and the seventh target image may have a scaling relationship.

According to the embodiments of the present disclosure, the sixth parameter information may include an eleventh position information. Alternatively, the sixth parameter information may include a twelfth position information and a sixth size information.

According to the embodiments of the present disclosure, the seventh parameter information may include a thirteenth position information. Alternatively, the seventh parameter information may include a fourteenth position information and a seventh size information.

According to the embodiments of the present disclosure, the eighth parameter information may include a fifteenth position information. Alternatively, the eighth parameter information may include a sixteenth position information and an eighth size information.

According to the embodiments of the present disclosure, the sixth target image and the seventh target image having a scaling relationship may mean that the seventh target image is obtained by reducing or enlarging the sixth target image. Alternatively, the sixth target image may be obtained by reducing or enlarging the seventh target image.

According to the embodiments of the present disclosure, upon a detection of a switching instruction, the controller 202 may determine the eighth parameter information according to the sixth parameter information and the seventh parameter information. For example, upon a detection of a switching instruction, the controller 202 may obtain a sixteenth position information according to a first predetermined coefficient, the twelfth position information and the fourteenth position information, and obtain the eighth size information according to a second predetermined coefficient, the sixth size information and the seventh size information. The first predetermined coefficient and the second predetermined coefficient may be integers greater than 0 and less than 1. The first predetermined coefficient and the second predetermined coefficient may be determined according to actual service needs and are not limited here. For example, the first predetermined coefficient and the second predetermined coefficient may be 0.5.

For example, the twelfth position information may include the horizontal coordinate of a first lower left vertex and the vertical coordinate of the first lower left vertex of the sixth target image. The fourteenth position information may include the horizontal coordinate of a second lower left vertex and the vertical coordinate of the second upper left vertex of the seventh target image. The sixteenth position information may include the horizontal coordinate of a third lower left vertex and the vertical coordinate of the third lower left vertex. The sixth size information may include a first width information and a first height information. The seventh size information may include a second width information and a second height information. The eighth size information may include a third width information and a third height information.

The horizontal coordinate of the third lower left vertex may be determined according to the first predetermined coefficient, the horizontal coordinate of the first lower left vertex, and the horizontal coordinate of the second lower left vertex. The vertical coordinate of the third lower left vertex may be determined according to the first predetermined coefficient, the vertical coordinate of the first lower left vertex, and the vertical coordinate of the second lower left vertex.

The third width information may be determined according to the second predetermined coefficient, the first width information, and the second width information. The third height information may be determined according to the second predetermined coefficient, the first height information, and the second height information.

According to the embodiments of the present disclosure, the controller 202 may process a target image with a larger size in the sixth target image and the seventh target image according to the eighth parameter information, so as to obtain the eighth target image. For example, when it is determined that the target image with the larger size in the sixth target image and the seventh target image is the sixth target image, the controller 202 may process the sixth target image according to the eighth parameter information to obtain the eighth target image. When it is determined that the target image with the larger size in the sixth target image and the seventh target image is the seventh target image, the controller 202 may process the seventh target image according to the eighth parameter information to obtain the eighth target image.

Obtaining the eighth target image according to the eighth parameter information, the sixth target image and the seventh target image according to the embodiments of the present disclosure will be further described below with reference to FIG. 6 in conjunction with specific embodiments.

Figure 6:
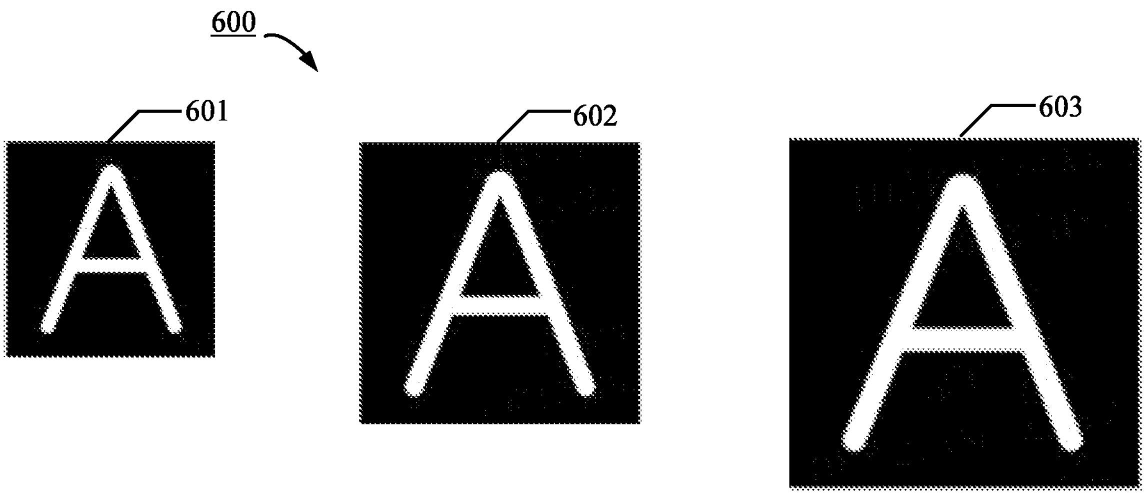
FIG. 6 schematically shows an example schematic diagram of obtaining an eighth target image according to an eighth parameter information, a sixth target image, and a seventh target image according to the embodiments of the present disclosure.

FIG. 6 schematically shows an example schematic diagram of obtaining the eighth target image according to the eighth parameter information, the sixth target image and the seventh target image according to the embodiments of the present disclosure.

As shown in FIG. 6, in 600, the sixth parameter information of the sixth target image 601 may include a twelfth position information and a sixth size information. The twelfth position information includes the horizontal coordinate and the vertical coordinate of a first lower left vertex of the sixth target image 601. The sixth size information may include a first width information and a first height information. The horizontal coordinate of the first lower left vertex is "336". The vertical coordinate of the first lower left vertex is "176". The first width information is "128". The first height information is "128".

The seventh parameter information of the seventh target image 603 may include a fourteenth position information and a seventh size information. The fourteenth position information includes the horizontal coordinate and the vertical coordinate of the second lower left vertex of the seventh target image 603. The second size information may include a second width information and a second height information. The horizontal coordinate of the second lower left vertex is "316". The vertical coordinate of the second lower left vertex is "156". The second width information is "168". The second height information is "168".

The controller may determine a first average value of the horizontal coordinate of the first lower left vertex and the horizontal coordinate of the second lower left vertex, and determine the first average value "356" as the horizontal coordinate of a third lower left vertex. The controller may determine a second average value of the vertical coordinate of the first lower left vertex and the vertical coordinate of the second lower left vertex, and determine the second average value "166" as the vertical coordinate of the third lower left vertex. The controller may determine a third average value of the first width information and the second width information, and determine the third average value "148" as a third width information. The controller may determine a fourth average value of the first height information and the second height information, and determine the fourth average value "148" as a third height information.

The seventh target image 603 may be processed according to the horizontal coordinate of the third lower left vertex, the vertical coordinate of the third lower left vertex, the third width information and the third height information included in the eighth parameter information, so as to obtain an eighth target image 602.

According to the embodiments of the present disclosure, in response to a detection of a switching instruction, the controller may determine the eighth parameter information according to the sixth parameter information and the seventh parameter information, and obtain the eighth target image according to the eighth parameter information, the sixth target image and the seventh target image, thereby increasing the number of target images without increasing the storage space. On this basis, the controller generates a fourth control instruction according to the eighth target image and the eighth parameter information of the eighth target image, and control the display module to display the eighth target image according to the fourth control instruction, thereby obtaining a smoother and finer display effect while reducing the number of pre-stored images.

According to the embodiments of the present disclosure, the controller 202 may determine a third region according to the sixth parameter information and the seventh parameter information, generate a fifth control instruction according to the sixth parameter information of the third region, the eighth target image and the eighth parameter information of the eighth target image, and control the display module 203, according to the fifth control instruction, to display the eighth target image and hide the display of at least one third sub-region in the third region in a frame displayed after switching from the sixth target image to the eighth target image.

According to the embodiments of the present disclosure, the fifth control instruction may refer to a control instruction for a complete process of the controller 202 controlling the display module 203 to switch from the sixth target image to the eighth target image. The frame displayed after switching from the sixth target image to the eighth target image may refer to the frame displayed after the display of the eighth target image is completed. A display content of the display picture on the display module 203 in the frame displayed after switching from the sixth target image to the eighth target image may be determined according to the processing speed of the controller 202. For example, the third region may include a third sub-region B1, a third sub-region B2, a third sub-region B3, and a third sub-region B4. In the frame displayed after switching from the sixth target image to the eighth target image, the eighth target image may be displayed, and the display of the third sub-region B1 may be hidden. Alternatively, in the frame displayed after switching from the sixth target image to the eighth target image, the eighth target image may be displayed, and the display of the third sub-region B1 and the third sub-region B2 may be hidden. Alternatively, in the frame displayed after switching from the sixth target image to the eighth target image, the eighth target image may be displayed, and the display of the third sub-region B1, the third sub-region B2 and the third sub-region B3 may be hidden. Alternatively, in the frame displayed after switching from the sixth target image to the eighth target image, the eighth target image may be displayed, and the third region may be hidden.

According to the embodiments of the present disclosure, upon a detection of switching from the sixth target image to a display of the eighth target image, the controller 202 may generate a fifth control instruction. The controller 202 may control the display module 203, according to the fifth control instruction, to display the sixth target image and hide the display of at least one third sub-region in the third region in the frame displayed after switching from the sixth target image to the eighth target image, so that the eighth target image may cover an overlapping region between the sixth target image and the eighth target image, and that the at least one third sub-region in the third region is not displayed on the display module 203 when the display module 203 displays the eighth target image. Hiding the display of the third sub-region may mean that a color of the third sub-region is consistent with a bottom color of the eighth target image or a predetermined background color. The bottom color of the eighth target image may be the predetermined background color.

For example, the controller 202 may control the display module 203, according to the fifth control instruction, to display the eighth target image in the frame displayed after switching from the sixth target image to the eighth target image, and call a background painting routine to set a pixel value of the at least one third sub-region to be consistent with a pixel value of the bottom color of the eighth target image or a pixel value of the predetermined background.

According to the embodiments of the present disclosure, since the controller controls the display module to display the eighth target image according to the fifth control instruction, the eighth target image may directly cover the overlapping region between the sixth target image and the eighth target image in the frame displayed after switching from the sixth target image to the eighth target image, so that the flickering process from bright to dark and then to bright during the switching from the sixth target image to the eighth target image may be effectively avoided, thereby improving the display effect and the user viewing experience.

According to the embodiments of the present disclosure, the sixth target image may be the first target image, and the seventh target image may be the second target image.

According to the embodiments of the present disclosure, the first target image may be the target pre-stored image. Alternatively, the first target image may be obtained by processing the target pre-stored image.

According to the embodiments of the present disclosure, the second target image may be the target pre-stored image. Alternatively, the second target image may be obtained by processing the target pre-stored image. Alternatively, the second target image may be another pre-stored image. Alternatively, the second target image may be obtained by processing another pre-stored image.

According to the embodiments of the present disclosure, the first target image is obtained by processing the target pre-stored image, so that the first target image may be obtained by using a pre-stored image, thereby further reducing the storage space.

According to the embodiments of the present disclosure, in the case that the first target image is obtained by processing the target pre-stored image, the controller 202 may process the target pre-stored image according to the parameter information of the target pre-stored image and the first parameter information of the first target image, so as to obtain the first target image.

According to the embodiments of the present disclosure, the controller 202 may determine an adjustment information according to the parameter information of the target pre-stored image and the first parameter information of the first target image, and adjust the target pre-stored image according to the adjustment information, so as to obtain the first target image.

According to the embodiments of the present disclosure, in the case that the second target image is obtained by processing the target pre-stored image, the controller 202 may process the target pre-stored image according to the parameter information of the target pre-stored image and the second parameter information of the second target image, so as to obtain the second target image.

According to the embodiments of the present disclosure, the controller 202 may determine, according to the parameter information of the target pre-stored image and the first parameter information of the first target image, an angle deviation between the target pre-stored image and a first target image to be generated, and obtain the first target image according to the target pre-stored image, the parameter information of the target pre-stored image, and the angle deviation.

According to the embodiments of the present disclosure, the first target image may be obtained by rotating the target pre-stored image. The parameter information of the target pre-stored image may include a position information. The position information may include a coordinate information of rotation point. The coordinate information of rotation point may include at least one of a coordinate information of center point or a coordinate information of other rotation fixed point.

According to the embodiments of the present disclosure, the first parameter information may include a second position information. The second position information may include a coordinate information of first lower left vertex, a coordinate information of first upper left vertex, a coordinate information of first upper right vertex, and a coordinate information of first lower right vertex.

According to the embodiments of the present disclosure, the controller 202 may determine the angle deviation between the coordinate information of rotation point and each of the coordinate information of first lower left vertex, the coordinate information of first upper left vertex, the coordinate information of first upper right vertex and the coordinate information of first lower right vertex, respectively.

According to the embodiments of the present disclosure, a size of the target pre-stored image is greater than the size of the first target image.

According to the embodiments of the present disclosure, the controller 202 may determine a reduction ratio according to the parameter information of the target pre-stored image and the first parameter information, determine a region to be eliminated in the target pre-stored image according to the reduction ratio, and process the region to be eliminated to obtain the first target image.

According to the embodiments of the present disclosure, the region to be eliminated may include at least one pixel to be eliminated. The region to be eliminated may refer to a region that needs to be eliminated. The parameter information of the target pre-stored image may include the size information. The first parameter information may include the first size information.

According to the embodiments of the present disclosure, the controller 202 may determine the first reduction ratio according to the first size information and the size information of the target pre-stored image, and then determine a first region to be eliminated in the target pre-stored image according to the first reduction ratio. The first region to be eliminated may include at least one pixel to be eliminated.

The controller 202 may eliminate the first region to be eliminated in the target pre-stored image according to a predetermined elimination strategy, so as to obtain the first target image. The predetermined elimination strategy may refer to a strategy of eliminating pixels from the target pre-stored image. The predetermined elimination strategy may include an elimination-at-intervals strategy. The elimination-at-intervals strategy may refer to a strategy of eliminating one row of pixels every other row and one column of pixels every other column.

For example, the size information of the target pre-stored image is "240×240", and the first size information of the first target image is "120×120". Therefore, it may be determined that the first reduction ratio is 0.5. The predetermined elimination strategy may be an elimination-at-intervals strategy. The first region to be eliminated may be determined according to the elimination-at-intervals strategy and the first reduction ratio. The first region to be eliminated may include 120 rows of pixels and 120 columns of pixels eliminated from the target pre-stored image.

According to the embodiments of the present disclosure, the controller 202 may determine a second reduction ratio according to the second parameter information and the parameter information of the target pre-stored image, determine a second region to be eliminated in the target pre-stored image according to the second reduction ratio, and process the second region to be eliminated to obtain the second target image.

According to the embodiments of the present disclosure, the size of the target pre-stored image may be less than the size of the first target image.

According to the embodiments of the present disclosure, the controller 202 may determine a first enlargement ratio according to the parameter information of the target pre-stored image and the first parameter information, determine a first region to be added to the target pre-stored image according to the first enlargement ratio, and process the third region to be added, so as to obtain the first target image.

According to the embodiments of the present disclosure, the size of the target pre-stored image may be less than the size of the second target image.

According to the embodiments of the present disclosure, the controller 202 may determine a second enlargement ratio according to the parameter information of the target pre-stored image and the second parameter information, determine a second region to be added to the target pre-stored image according to the second enlargement ratio, and process the second region to be added to obtain the second target image.

According to the embodiments of the present disclosure, the region to be added may include at least one pixel to be added. The region to be added may refer to a region that needs to be displayed. The parameter information of the target pre-stored image may include a size information. The first parameter information may include a first size information. The controller 202 may determine the first enlargement ratio according to the first size information and the size information of the target pre-stored image, and then determine the first region to be added to the target pre-stored image according to the first enlargement ratio. The first region to be added may include at least one pixel to be added. The controller 202 may add the first region to be added to the target pre-stored image according to a predetermined addition strategy, so as to obtain the first target image. The predetermined addition strategy may refer to a strategy of displaying the pixel to be added. The pixel value of the pixel to be added may be determined according to the pixel value of adjacent pixels. The predetermined addition strategy may include an addition-at-intervals strategy. The addition-at-intervals strategy may refer to a strategy of adding the display of one row of pixels every other row and adding the display of one column of pixels every other column.

For example, the size information of the target pre-stored image is "120×120", and the first size information of the first target image is "240×240". Therefore, it may be determined that the second reduction ratio is 2. The predetermined addition strategy may be an addition-at-intervals strategy. The first region to be added may be determined according to the addition-at-intervals strategy and the first enlargement ratio. The first region to be added may include added 120 rows of pixels and 120 columns of pixels.

According to the embodiments of the present disclosure, the controller 202 may determine an overflow region of the target pre-stored image according to a display region information of the display module 203 and the parameter information of the target pre-stored image, and clip the overflow region to obtain the first target image.

According to the embodiments of the present disclosure, the overflow region may be a region of the target pre-stored image outside the display region of the display module 203.

According to the embodiments of the present disclosure, the target pre-stored image and the first target image may have a translation relationship. The target pre-stored image may be stored in the display buffer of the controller 202. The parameter information of the target pre-stored image may include the complete position information of the target pre-stored image. Alternatively, the parameter information of the target pre-stored image may include a component position information and a size information of the target pre-stored image. The display region information may include a display position information of the display region of the display module 203.

According to the embodiments of the present disclosure, the controller 202 may determine the overflow region beyond the display region of the display module 203 in the target pre-stored image according to the display region information of the display module 203 and the parameter information of the target pre-stored image, and clip the overflow region to obtain the first target image.

Obtaining the first target image by processing the target pre-stored image according to the embodiments of the present disclosure will be further described below with reference to FIG. 7A, FIG. 7B and FIG. 7C in conjunction with specific embodiments.

Figure 7A:
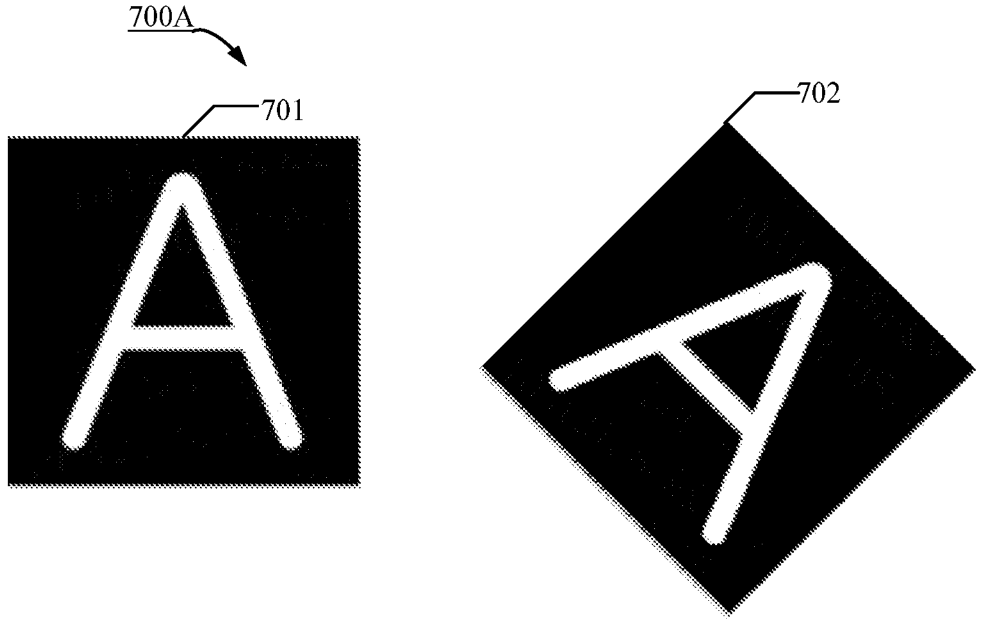
FIG. 7A schematically shows an example schematic diagram of processing a target pre-stored image to obtain a first target image according to the embodiments of the present disclosure.

FIG. 7A schematically shows an example schematic diagram of processing the target pre-stored image to obtain the first target image according to the embodiments of the present disclosure.

As shown in FIG. 7A, in 700A, an angle deviation between a target pre-stored image 701 and a first target image to be generated may be determined according to the parameter information of the target pre-stored image 701 and the first parameter information. The first target image 702 may be obtained according to the target pre-stored image 701, the parameter information of the target pre-stored image 701, and the angle deviation.

Figure 7B:
FIG. 7B schematically shows an example schematic diagram of processing the target pre-stored image to obtain the first target image according to other embodiments of the present disclosure.

FIG. 7B schematically shows an example schematic diagram of processing the target pre-stored image to obtain the first target image according to other embodiments of the present disclosure.

As shown in FIG. 7B, in 700B, a reduction ratio is determined according to the parameter information of a target pre-stored image 703 and a first parameter information 704. A region to be eliminated from the target pre-stored image is determined according to the reduction ratio, and the region to be eliminated is processed to obtain a first target image 704.

Figure 7C:
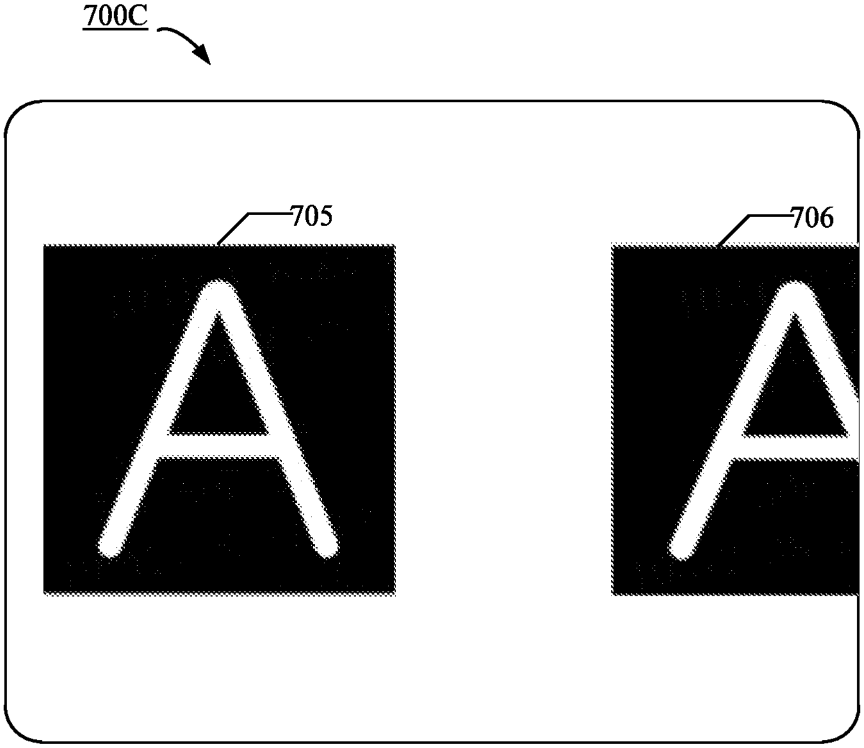
FIG. 7C schematically shows an example schematic diagram of processing the target pre-stored image to obtain the first target image according to other embodiments of the present disclosure.

FIG. 7C schematically shows an example schematic diagram of processing the target pre-stored image to obtain the first target image according to other embodiments of the present disclosure.

As shown in FIG. 7C, in 700C, an overflow region of a target pre-stored image 705 is determined according to the display region information of the display module and a parameter information of the target pre-stored image 705, and the overflow region is clipped to obtain a first target image 706.

According to the embodiments of the present disclosure, the pre-stored image signal may not appear during a time period between a time instant when the first target image starts to be presented on the display module 203 and a time instant when the second target image starts to be presented on the display module 203.

According to the embodiments of the present disclosure, the time instant when the first target image starts to be presented on the display module 203 may refer to a time instant when the display module 203 starts to progressively scan and present a display picture containing the first target image. The time instant when the second target image starts to be presented on the display module 203 may refer to a time instant when the display module 203 starts to progressively scan and present a display picture containing the second target image.

According to the embodiments of the present disclosure, the pre-stored image signal may represent a signal allowing the memory 201 to transmit the pre-stored image to the controller 202.

According to the embodiments of the present disclosure, the pre-stored image signal may only appear during a process of the memory 201 transmitting the pre-stored image to the controller 202. The first target image and the second target image may be obtained according to the pre-stored image. Therefore, the pre-stored image signal does not appear during the time period between the time instant when the first target image starts to be presented on the display module 203 and the time instant when the second target image starts to be presented on the display module 203.

It may be understood that the first target image and the second target image may be obtained according to a same target pre-stored image, and there is no need to acquire again from the memory 201. Since the pre-stored image signal may only appear in the process of the memory 201 transmitting the pre-stored image to the controller 202, the pre-stored image signal may not appear during the time period from the time instant when the first target image starts to be presented on the display module 203 to the time instant when the second target image starts to be presented on the display module 203.

Figure 8:
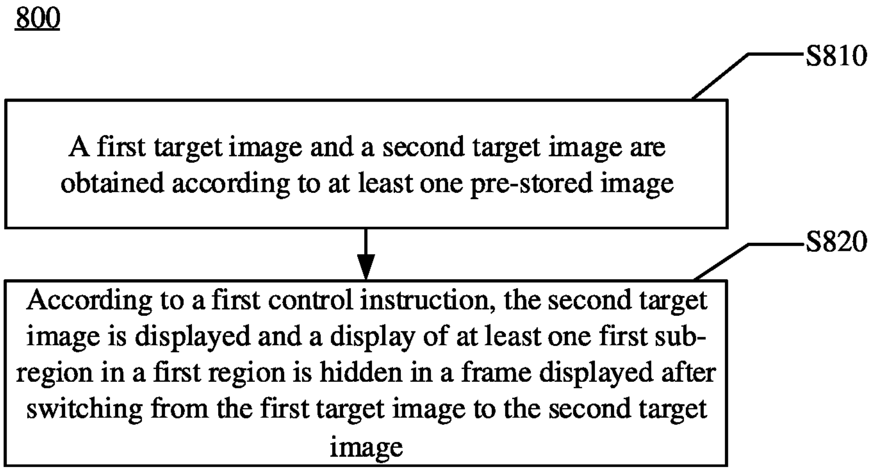
FIG. 8 schematically shows a flowchart of a display method according to the embodiments of the present disclosure.

FIG. 8 schematically shows a flowchart of a display method according to the embodiments of the present disclosure.

As shown in FIG. 8, a method 800 includes operations S810 to S820.

In operation S810, a first target image and a second target image are obtained according to at least one pre-stored image.

In operation S820, according to a first control instruction, the second target image is displayed and a display of at least one first sub-region in a first region is hidden in a frame displayed after switching from the first target image to the second target image.

According to the embodiments of the present disclosure, a size of the first target image is different from a size of the second target image, and/or a position of the first target image in a display picture is different from a position of the second target image in the display picture.

According to the embodiments of the present disclosure, the first region represents a region located within an outer contour of the first target image and not overlapping with the second target image.

According to the embodiments of the present disclosure, the above-mentioned display method may further include the following operations.

The first region is determined according to a first parameter information of the first target image and a second parameter information of the second target image. A first control instruction is generated according to the first parameter information of the first region, the second target image, and the second parameter information.

According to the embodiments of the present disclosure, the first parameter information includes a first position information. Alternatively, the first parameter information includes a second position information and a first size information.

According to the embodiments of the present disclosure, the second parameter information includes a third position information. Alternatively, the second parameter information includes a fourth position information and a second size information.

According to the embodiments of the present disclosure, the above-mentioned display method may further include the following operations.

A positional relationship between the first region and the second target image is determined according to the second parameter information and the first parameter information of the first region. When it is determined according to the positional relationship that the first region includes a first target sub-region, the second target image is displayed and the display of the first target sub-region is hidden according to the first control instruction. Alternatively, when it is determined according to the positional relationship that the first region includes the first target sub-region and a second target sub-region, the second target image is displayed and the display of the first target sub-region and the second target sub-region is hidden according to the first control instruction. Alternatively, when it is determined according to the positional relationship that the first region includes the first target sub-region, the second target sub-region and a third target sub-region, the second target image is displayed and the display of the first target sub-region, the second target sub-region and the third target sub-region is hidden according to the first control instruction. Alternatively, when it is determined according to the positional relationship that the first region includes the first target sub-region, the second target sub-region, the third target sub-region and a fourth target sub-region, the second target image is displayed and the display of the first target sub-region, the second target sub-region, the third target sub-region and the fourth target sub-region is hidden according to the first control instruction.

According to the embodiments of the present disclosure, the first target sub-region is the first sub-region located on the side of the second target image in the first direction, the second target sub-region is the first sub-region located on the side of the second target image in the second direction, the third target sub-region is the first sub-region located on the side of the second target image in the third direction, and the fourth target sub-region is the first sub-region located on the side of the second target image in the fourth direction.

According to the embodiments of the present disclosure, the display duration of the first target image is only one frame, and/or the display duration of the second target image is only one frame.

According to the embodiments of the present disclosure, the above-mentioned display method may further include the following operations.

A plurality of target images are stored. The plurality of target images are stored according to their respective third parameter information. The third parameter information includes a fifth position information. Alternatively, the third parameter information includes a sixth position information and a third size information. A second control instruction for the plurality of target images is generated in response to a detection of a synchronous display instruction. According to the second control instruction, the plurality of target images are synchronously displayed in a same frame of display picture.

According to the embodiments of the present disclosure, the plurality of target images include a second target image and a third target image.

According to the embodiments of the present disclosure, a size of the third target image is different from the size of the first target image, and/or a position of the third target image in the display picture is different from the position of the first target image in the display picture.

Those skilled in the art may understand that various embodiments of the present disclosure and/or features described in the claims may be combined in various ways, even if such combinations are not explicitly described in the present disclosure. In particular, the various embodiments of the present disclosure and/or the features described in the claims may be combined in various ways without departing from the spirit and teachings of the present disclosure. All these combinations fall within the scope of the present disclosure.

Embodiments of the present disclosure have been described above. However, these embodiments are just for illustrative purposes, and are not intended to limit the scope of the present disclosure. Although various embodiments have been described separately above, this does not mean that measures in the various embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A display device, comprising:

a memory configured to store at least one pre-stored image; and a controller configured to: obtain a first target image and a second target image according to the at least one pre-stored image; and control a display module, according to a first control instruction, to display the second target image and hide a display of at least one first sub-region in a first region in a frame displayed after switching from the first target image to the second target image;

wherein a relationship between the first target image and the second target image meets at least one of: a size of the first target image is different from a size of the second target image a position of the first target image in a display picture is different from a position of the second target image in the display picture;

wherein the first region represents a region located within an outer contour of the first target image and not overlapping with the second target image; and wherein the controller is further configured to control the display module, according to the first control instruction, to display the second target image and continue to display at least one first sub-region in the first region in the frame displayed after switching from the first target image to the second target image.

2. The display device according to claim 1, wherein the first target image is obtained according to a target pre-stored image, the second target image is obtained according to a pre-stored image different from the target pre-stored image, and the target pre-stored image is one of the at least one pre-stored image; or the first target image and the second target image are obtained according to a same pre-stored image.

3. The display device according to claim 2, wherein the first target image is the target pre-stored image; or wherein the first target image is obtained by processing the target pre-stored image, wherein in a case that the first target image is obtained by processing the target pre-stored image, the controller is further configured to process the target pre-stored image according to a parameter information of the target pre-stored image and a first parameter information of the first target image, so as to obtain the first target image.

4. The display device according to claim 3, wherein the controller is further configured to: determine an angle deviation between the target pre-stored image and a first target image to be generated, according to the parameter information of the target pre-stored image and the parameter information of the first target image; and obtain the first target image according to the target pre-stored image, the parameter information of the target pre-stored image, and the angle deviation.

5. The display device according to claim 3, wherein a size of the target pre-stored image is greater than the size of the first target image; and wherein the controller is configured to: determine a reduction ratio according to the parameter information of the target pre-stored image and the parameter information of the first target image; determine a region to be eliminated in the image according to the reduction ratio;

and process the region to be eliminated to obtain the first target image.

6. The display device according to claim 3, wherein the controller is further configured to: determine an overflow region of the target pre-stored image according to a display region information and the parameter information of the target pre-stored image; and clip the overflow region to obtain the first target image; and wherein the overflow region is a region of the target pre-stored image outside a display region of the display module.

7. The display device according to claim 3, wherein a pre-stored image signal does not appear during a time period between a time instant when the first target image starts to be presented on the display module and a time instant when the second target image starts to be presented on the display module; and wherein the pre-stored image signal represents a signal allowing the memory to transmit the pre-stored image to the controller.

8. The display device according to claim 1, wherein the controller is configured to: determine the first region according to a parameter information of the first target image and a parameter information of the second target image; and generate the first control instruction according to the parameter information of the first target image in the first region, the second target image, and the parameter information of the second target image;

wherein the parameter information comprises a first position information, or the parameter information comprises a second position information and a size information.

9. The display device according to claim 8, wherein the controller is further configured to:

determine a positional relationship between the first region and the second target image according to the parameter information of the second target image and the parameter information of the first target image in the first region;

control the display module, according to the first control instruction, to display the second target image and hide a display of a first target sub-region, in response to determining that the first region comprises the first target sub-region according to the positional relationship; or control the display module, according to the first control instruction, to display the second target image and hide a display of the first target sub-region and a second target sub-region, in response to determining that the first region comprises the first target sub-region and the second target sub-region according to the positional relationship; or control the display module, according to the first control instruction, to display the second target image and hide a display of the first target sub-region, the second target sub-region and a third target sub-region, in response to determining that the first region comprises the first target sub-region, the second target sub-region and the third target sub-region according to the positional relationship; or control the display module, according to the first control instruction, to display the second target image and hide a display of the first target sub-region, the second target sub-region, the third target sub-region and a fourth target sub-region, in response to determining that the first region comprises the first target sub-region, the second target sub-region, the third target sub-region and the fourth target sub-region according to the positional relationship; and wherein the first target sub-region is a first sub-region located on a side of the second target image in a first direction, the second target sub-region is a first sub-region located on a side of the second target image in a second direction, the third target sub-region is a first sub-region located on a side of the second target image in a third direction, and the fourth target sub-region is a first sub-region located on a side of the second target image in a fourth direction.

10. The display device according to claim 9, wherein two of the first direction, the second direction, the third direction and the fourth direction are parallel to a row extension direction of a pixel arrangement of the second target image, and the other two are parallel to a column extension direction of the pixel arrangement of the second target image.

11. The display device according to claim 1, wherein the controller is further configured to:

control the display module, according to the first control instruction, to display the second target image and hide a display of at least partial region located on a side of the second target image in a first direction; or control the display module, according to the first control instruction, to display the second target image and hide a display of at least partial region located on the side of the second target image in the first direction and a side of the second target image in a second direction; or control the display module, according to the first control instruction, to display the second target image and hide a display of at least partial region located on the side of the second target image in the first direction, the side of the second target image in the second direction and a side of the second target image in a third direction; or control the display module, according to the first control instruction, to display the second target image and hide a display of at least partial region located on the side of the second target image in the first direction, the side of the second target image in the second direction, the side of the second target image in the third direction and a side of the second target image in a fourth direction; or control the display module, according to the first control instruction, to display the second target image and hide a display of the first region; and wherein two of the first direction, the second direction, the third direction and the fourth direction are parallel to a row extension direction of a pixel arrangement of the second target image, and the other two are parallel to a column extension direction of the pixel arrangement of the second target image.

12. The display device according to claim 1, wherein the controller comprises:

a display buffer configured to store a plurality of target images, wherein the plurality of target images are stored according to respective parameter information of the plurality of target images, and the parameter information comprises a first position information, or the parameter information comprises a second position information and a size information; and a processor configured to: generate a second control instruction for the plurality of target images in response to a detection of a synchronous display instruction; and control the display module, according to the second control instruction, to synchronously display the plurality of target images in a same frame of display picture.

13. The display device according to claim 1, wherein the controller is further configured to:

determine, based on an initiation identification, a second region according to a parameter information of a fourth target image and a parameter information of a fifth target image; and generate a third control instruction according to the parameter information of the fourth target image in the second region, the fourth target image, and the parameter information of the fifth target image; control the display module, according to the third control instruction, to display the fourth target image and hide a display of at least one second sub-region in the second region in a frame displayed after switching from the fourth target image to the fifth target image;

wherein the initiation identification represents an initiation of an operation of processing the fifth target image while the fourth target image is being displayed;

wherein the second region represents a region located within an outer contour of the fourth target image and not overlapping with the fifth target image;

wherein the parameter information comprises a first position information, or the parameter information comprises a second position information and a size information.

14. The display device according to claim 1, wherein a driving signal and a pre-stored image signal exist simultaneously in a process of the controller controlling the display module to display the first target image; and wherein the driving signal represents a signal allowing the controller to drive the display module to display, and the pre-stored image signal represents a signal allowing the memory to transmit the pre-stored image to the controller.

15. The display device according to claim 1, wherein a display duration of the first target image is one frame; and wherein the controller is configured to control the display module, according to the first control instruction, to display the second target image and completely hide a display of the first region in the frame displayed after switching from the first target image to the second target image.

16. The display device according to claim 1, wherein the controller is configured to: determine parameter information of an eighth target image according to a parameter information of a sixth target image and a parameter information of a seventh target image in response to a detection of a switching instruction; obtain the eighth target image according to the parameter information of the eight target image, the sixth target image, and the seventh target image; generate a fourth control instruction according to the eighth target image and the parameter information of the eighth target image; and control the display module, according to the fourth control instruction, to display the eighth target image;

wherein the switching instruction represents an instruction to switch from a complete display of the sixth target image to a display of the seventh target image, and the sixth target image and the seventh target image have a scaling relationship;

wherein the parameter information comprises a first position information, or the parameter information comprises a second position information and a size information.

17. The display device according to claim 16, wherein the controller is further configured to:

determine a third region according to the parameter information of the sixth target image and the parameter information of the seventh target image; generate a fifth control instruction according to the parameter information of the sixth target image in the third region, the eighth target image, and the parameter information of the eighth target image; and control the display module, according to the fifth control instruction, to display the eighth target image and hide a display of at least one third sub-region in the third region in a frame displayed after switching from the sixth target image to the eighth target image.

18. The display device according to claim 1, wherein the controller is configured to control the display module to display a first background while displaying the first target image, and a color of the first background located at a periphery of the first target image is consistent with a bottom color of the first target image; and wherein the controller is configured to control the display module to display a second background while displaying the second target image, and a color of the second background located at a periphery of the first target image is consistent with a bottom color of the second target image.

19. The display device according to claim 1, wherein the controller is configured to control the display module to display a first background while displaying the first target image, and a color of the first background located at a periphery of the first target image is consistent with a bottom color of the first target image; or wherein the controller is configured to control the display module to display a second background while displaying the second target image, and a color of the second background located at a periphery of the first target image is consistent with a bottom color of the second target image.

20. A display method, comprising:

obtaining a first target image and a second target image according to at least one pre- stored image; and displaying the second target image and hiding a display of at least one first sub-region in a first region in a frame displayed after switching from the first target image to the second target image, according to a first control instruction;

wherein a relationship between the first target image and the second target image meets at least one of: a size of the first target image is different from a size of the second target image, a position of the first target image in a display picture is different from a position of the second target image in the display picture;

wherein the first region represents a region located within an outer contour of the first target image and not overlapping with the second target image; and wherein the method further comprises:

controlling a display module, according to the first control instruction, to display the second target image and continue to display at least one first sub-region in the first region in the frame displayed after switching from the first target image to the second target image.

* * * * *